US012390906B2

(12) United States Patent
Ikuta et al.

(10) Patent No.: US 12,390,906 B2
(45) Date of Patent: Aug. 19, 2025

(54) SCREW-TIGHTENING TOOL

(71) Applicant: MAKITA CORPORATION, Anjo (JP)

(72) Inventors: Hiroki Ikuta, Anjo (JP); Takumi Hayashi, Anjo (JP)

(73) Assignee: MAKITA CORPORATION, Anjo (JP)

(*) Notice: Subject to any disclaimer, the term of this patent is extended or adjusted under 35 U.S.C. 154(b) by 295 days.

(21) Appl. No.: 17/948,367

(22) Filed: Sep. 20, 2022

(65) Prior Publication Data

US 2023/0124236 A1 Apr. 20, 2023

(30) Foreign Application Priority Data

Oct. 14, 2021 (JP) ................................ 2021-168596

(51) Int. Cl.
*B25B 21/00* (2006.01)
*B25F 5/00* (2006.01)

(52) U.S. Cl.
CPC .............. *B25B 21/00* (2013.01); *B25F 5/001* (2013.01)

(58) Field of Classification Search
CPC ..... B25B 21/00; B25B 21/002; B25B 21/004; B25B 21/007; B25B 21/008; B25B 21/023; B25B 23/14; B25B 23/141; B25B 23/147; B25B 23/0064; B25F 5/001; F16H 13/08; F16H 13/54; F16H 13/58; F16H 13/64; F16H 2200/0034; F16H 2200/2064
See application file for complete search history.

(56) References Cited

U.S. PATENT DOCUMENTS

2009/0223691 A1* 9/2009 Ikuta ...................... B25D 17/26 173/171
2012/0160535 A1* 6/2012 Ikuta ...................... B25B 21/00 173/176
2021/0039230 A1* 2/2021 Ikuta ...................... B25F 5/001

FOREIGN PATENT DOCUMENTS

JP S59-132768 U 9/1984
JP 2018-111206 A 7/2018
JP 2019-141945 A 8/2019
WO WO-2020162268 A1 * 8/2020

OTHER PUBLICATIONS

Mar. 11, 2025 Office Action issued in Japanese Patent Application No. 2021-168596.

* cited by examiner

*Primary Examiner* — Robert J Scruggs
(74) *Attorney, Agent, or Firm* — Oliff PLC

(57) ABSTRACT

A screw-tightening tool includes a housing, a motor, a spindle, a first clutch and a second clutch. The first clutch is operably coupled to an output shaft and the spindle, and is configured to transmit power from the output shaft to the spindle only when the output shaft is rotationally driven in a first direction. The second clutch is operably coupled to the output shaft and the spindle, and is configured to transmit the power from the output shaft to the spindle only when the output shaft is rotationally driven in a second direction. An output rotation speed of the spindle when the power is transmitted via the first clutch is different from an output rotation speed of the spindle when the power is transmitted via the second clutch, in response to the same rotation speed of the output shaft of the motor.

19 Claims, 17 Drawing Sheets

SCREW-TIGHTENING TOOL

CROSS-REFERENCE TO RELATED APPLICATION

The present application claims priority to Japanese patent application No. 2021-168596 filed on Oct. 14, 2021, the contents of which are hereby fully incorporated herein by reference.

TECHNICAL FIELD

The present disclosure relates to a screw-tightening tool.

BACKGROUND

A screw-tightening tool is configured to rotationally drive a spindle in a normal direction in a screw-tightening operation and to rotationally drive the spindle in a reverse direction, which is opposite to the normal direction, in a screw-loosening operation. For example, Japanese Unexamined Patent Application Publication No. 2019-141945 discloses a screw-tightening tool configured to start rotation of a spindle in response to pushing of the spindle. In a screw-loosening operation, a smaller pushing force needs to be applied to a screw than that required in a screw-tightening operation. Thus, this screw-tightening tool is configured to start rotation of the spindle in the screw-loosening operation when the spindle is pushed by a smaller amount than that in the screw-tightening operation.

SUMMARY

The above-described screw-tightening tool can decrease the amount by which the spindle needs to be pushed in the screw-loosening operation. However, there is still room for improvement in such a screw-tightening tool.

Accordingly, it is one non-limiting object of the present disclosure to provide a screw-tightening tool that can achieve improved operating efficiency.

A non-limiting aspect of the present disclosure provides a screw-tightening tool including a housing, a motor, a spindle, a first clutch and a second clutch.

The motor is within the housing. The motor has an output shaft that is configured to be rotationally driven selectively in a first direction and a second direction that is opposite to the first direction. The first direction corresponds to a direction for tightening a screw. The second direction corresponds to a direction for loosening the screw. The spindle is supported by the housing to be movable along a driving axis and to be rotatable around the driving axis. The driving axis defines a front-rear direction of the screw-tightening tool. The spindle has a front end portion that is configured to removably receive a tool accessory.

The first clutch is operably coupled to the output shaft and the spindle. The first clutch is configured to transmit power from the output shaft to the spindle only when the output shaft is rotationally driven in the first direction. The second clutch is operably coupled to the output shaft and the spindle. The second clutch is configured to transmit power from the output shaft to the spindle only when the output shaft is rotationally driven in the second direction. Further, an output rotation speed of the spindle when the power is transmitted via the first clutch is different from an output rotation speed of the spindle when the power is transmitted via the second clutch, in response to a same rotation speed of the output shaft of the motor.

In the screw-tightening tool of the present aspect, the power is transmitted from the motor to the spindle via the first clutch in the screw-tightening operation, while the power is transmitted from the motor to the spindle via the second clutch in the screw-loosening operation. Thus, the power is transmitted via different paths between the screw-tightening operation and the screw-loosening operation. Further, the output rotation speed of the spindle when the power is transmitted via the first clutch is different from the output rotation speed of the spindle when the power is transmitted via the second clutch, in response to the same (identical) rotation speed of the output shaft of the motor. Thus, even if the output shaft of the motor is rotationally driven at the same speed in the screw-tightening operation and in the screw-loosening operation, the spindle (and the screw) can be rotated at different rotation speeds that are suitable to the screw-tightening operation and the screw-loosening operation, respectively. Consequently, operating efficiency of each operation can be optimized.

DETAILED DESCRIPTION OF THE EMBODIMENTS

Figure 1:
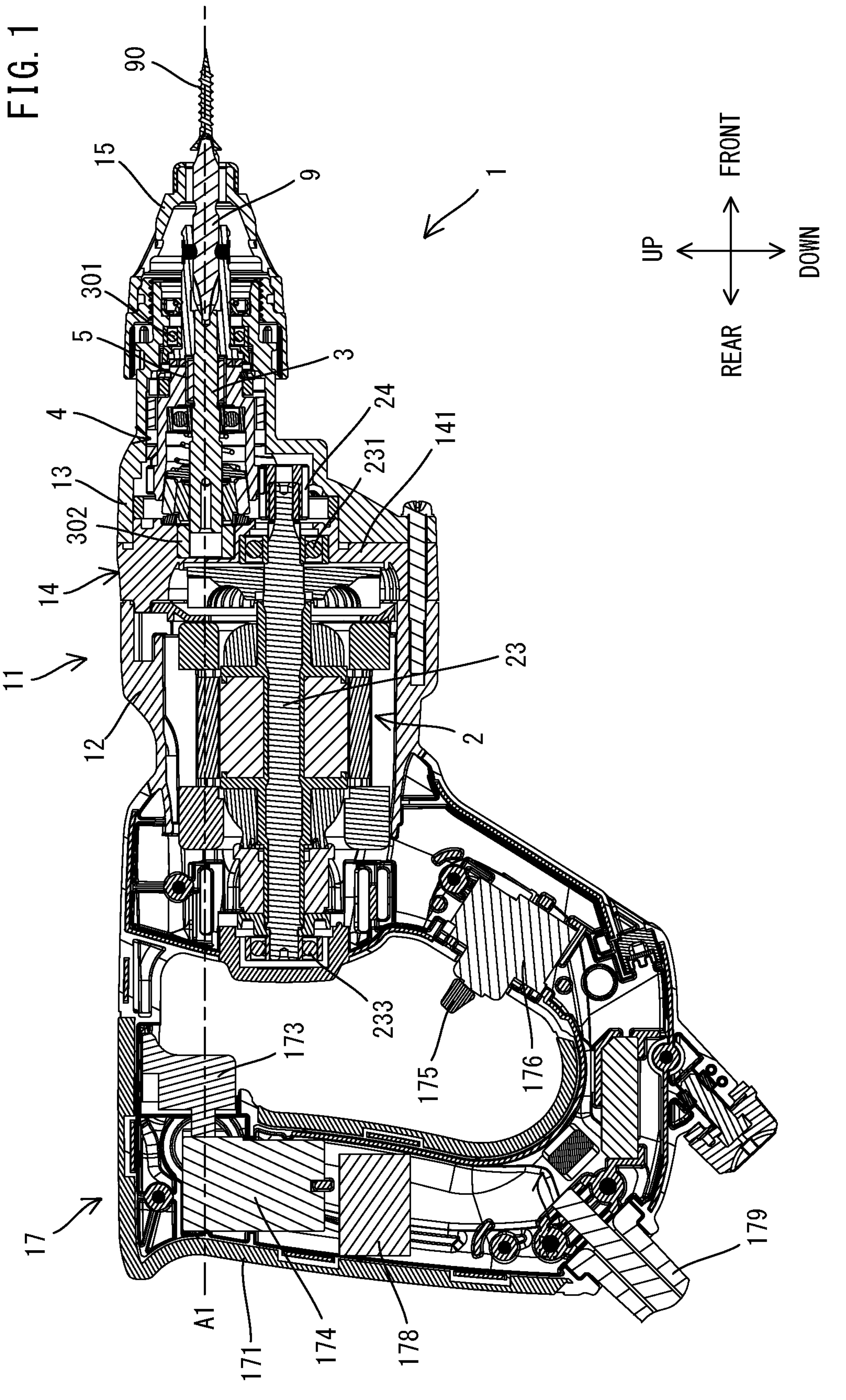
FIG. 1 is a sectional view of a screwdriver according to one embodiment of the present disclosure, wherein a spindle is at an initial position.

In the non-limiting embodiment of the present disclosure, the first clutch may be configured to selectively transmit the power, depending on a position of the spindle in the front-rear direction. The second clutch may be configured to transmit the power regardless of the position of the spindle in the front-rear direction. According to this embodiment, in the screw-tightening operation, the spindle can be selectively rotated, depending on the position of the spindle in the front-rear direction, i.e., depending on whether the screw is being pressed against a workpiece. On the other hand, in the screw-loosening operation, the spindle can be rotated even if the screw is not pressed against the workpiece, so that the screw-loosening operation can be started immediately.

In addition or in the alternative to the preceding embodiments, the screw-tightening tool may further include a restricting mechanism that is configured to restrict the spindle from moving in the front-rear direction only when the output shaft is rotationally driven in the second direction. According to this embodiment, the restricting mechanism can reliably prevent the first clutch from operating when the output shaft is rotationally driven in the second direction.

In addition or in the alternative to the preceding embodiments, the restricting mechanism may include a first restricting part and a second restricting part. The first restricting part may be rotatable between a first position and a second position in a circumferential direction around the driving axis. The first restricting part may be configured to be placed at the first position in response to rotation of the output shaft in the first direction, and to be placed at the second position in response to rotation of the output shaft in the second direction. The second restricting part may be configured to allow the spindle to move in the front-rear direction when the first restricting part is at the first position and to restrict the spindle from moving in the front-rear direction when the first restricting part is at the second position. According to this embodiment, the restricting mechanism having a simple structure can appropriately allow the spindle to move in the front-rear direction and can appropriately restrict the spindle from moving in the front-rear direction, depending on the rotational direction of the output shaft of the motor.

In addition or in the alternative to the preceding embodiments, the screw-tightening tool may further include a rotational member. The rotational member may be disposed between the output shaft and the spindle in a power transmission path and may be configured to be rotated by the output shaft. The first restricting part may be disposed around the rotational member to be selectively rotatable relative to the rotational member. The first restricting part may be configured to co-rotate with the rotational member only between the first position and the second position. The term "co-rotation" herein means that a second member that is in contact with a first member rotates together with the first member in response to rotation of the first member, due to a frictional force between contact surfaces of the first and second members. The second restricting part may be substantially immovable relative to the housing. The second restricting part may be formed as a member that is originally separate (discrete) from the housing and directly or indirectly fixed to the housing. Alternatively, the second restricting part may be a portion of the housing. According to this embodiment, the first restricting part that is rotatable between the first position and the second position in the circumferential direction can be easily embodied, utilizing the rotational member.

In addition or in the alternative to the preceding embodiments, the second restricting part may include a wall part that extends in the circumferential direction behind the first restricting part in the front-rear direction. A front end surface of the wall part may include a first surface that extends in a direction orthogonal to the driving axis, and a second surface that extends obliquely (diagonally) rearward from one end of the first surface in the circumferential direction. The first surface may be configured to come into contact with the front restricting part at the second position, from behind. The second surface may be configured to allow the spindle to move in the front-rear direction. According to this embodiment, the second restricting part having a simple structure can reliably prevent the first clutch from operating when the output shaft is rotationally driven in the second direction.

In addition or in the alternative to the preceding embodiments, the first clutch may be configured to function as a speed-reducing mechanism. According to this embodiment, since the screw-tightening tool does not need a speed-reducing mechanism separately from the first clutch, the screw-tightening tool can be made compact.

In addition or in the alternative to the preceding embodiments, the speed-reducing mechanism may include a sun member, a ring member and a carrier that are coaxial with the driving axis, and planetary rollers rollably retained by the carrier. The ring member may be configured to be rotated by the output shaft. The carrier may be configured to be rotated integrally with the spindle. The planetary rollers may be at least partially disposed between a tapered outer peripheral surface of the sun member and a tapered inner peripheral surface of the ring member in a radial direction of the ring member. The ring member may be configured to move integrally with the spindle in the front-rear direction relative to the sun member. The first clutch may be configured to transmit the power when the planetary rollers selectively come into frictional contact with the tapered outer peripheral surface of the sun member and the tapered inner peripheral surface of the ring member in response to rearward movement of the spindle from an initial position. According to this embodiment, the screw-tightening tool having a rational structure can be achieved that employs a so-called planetary-roller-type speed-reducing mechanism, as the first clutch, that is configured to operate (be activated) in response to the movement of the spindle in the front-rear direction.

In addition or in the alternative to the preceding embodiments, the screw-tightening tool may further comprise a circulation passage in the housing. The spindle may have a first hole that extends forward from a rear end of the spindle, and a second hole that communicates with the first hole. The second hole may extend in a direction intersecting with the first hole and may be open to an outer peripheral surface of the spindle. The circulation passage may be configured to return a lubricant, which has passed through the first hole and the second hole and has flowed outside the spindle, to the rear end of the spindle. According to this embodiment, the lubricant that has flowed outside the second hole due to the centrifugal force of the rotating spindle can be returned into the first hole to circulate within the housing. Consequently, the elements inside the housing can be efficiently lubricated.

In addition or in the alternative to the preceding embodiments, a reservoir for the lubricant may be disposed in the circulation passage. According to this embodiment, the lubricant can be stored or accumulated in the reservoir to be circulated efficiently. An element (for example, a felt) that is configured to absorb and retain the lubricant may be disposed in the reservoir.

A screwdriver 1 according to a representative, non-limiting embodiment of the present disclosure is now described in detail with reference to the drawings. The screwdriver 1 is an example of a screw-tightening tool that is capable of selectively performing a screw-tightening operation and a screw-loosening operation by rotationally driving a tool accessory (specifically, a driver bit 9) removably coupled to a spindle 3.

First, the general structure of the screwdriver 1 is described.

As shown in FIG. 1, an outer shell of the screwdriver 1 is formed by an elongate body housing 11 (also referred to as a tool body) and a handle 17.

The body housing 11 houses a motor 2 and the elongate spindle 3. The spindle 3 is disposed such that a rotational axis of the spindle 3 (i.e., a driving axis A1 of the driver bit 9) extends along a longitudinal direction of the body housing 11. One end portion of the spindle 3 is disposed in one end portion of the body housing 11 in its longitudinal direction. The driver bit 9 is removably coupled to this end potion of the spindle 3.

The handle 17 is basically C-shaped and connected to the other end portion of the body housing 11 in its longitudinal direction, so that the body housing 11 and the handle 17 form a loop shape. The handle 17 includes a grip part 171 configured to be held by a user. The grip part 171 is spaced apart from the body housing 11 and linearly extends in a direction that is generally orthogonal to the driving axis A1. One end portion in a longitudinal direction of the grip part 171 is located on the driving axis A1. A trigger 173 is provided on this end portion. A power cable 179, which is connectable to an external alternate current power source, is connected to the other end portion of the grip part 171.

When the trigger 173 is depressed by the user, the motor 2 is driven and thus the spindle 3 is rotationally driven integrally with the driver bit 9. Thus, a screw 90, which is engaged with the driver bit 9, is rotated.

In the following description, for the sake of convenience, an extension direction of the driving axis A1 is defined as a front-rear direction of the screwdriver 1. In the front-rear direction, the side on which the driver bit 9 is removably received is defined as a front side of the screwdriver 1, and the other side on which the grip part 171 is disposed is defined as a rear side of the screwdriver 1. A direction that is orthogonal to the driving axis A1 and that generally corresponds to the extension direction of the grip part 171 is defined as an up-down direction of the screwdriver 1. In the up-down direction, the side on which the trigger 173 is disposed is defined as an upper side of the screwdriver 1, and the side on which the power cable 179 is connected to the grip part 171 is defined as a lower side of the screwdriver 1. A direction that is orthogonal to the front-rear direction and the up-down direction is defined as a left-right direction of the screwdriver 1.

The detailed structure of the screwdriver 1 is now described.

First, the detailed structure of the body housing 11 and elements or structures disposed within the body housing 11 are described.

As shown in FIG. 1, the body housing 11 includes a tubular rear housing 12 that mainly houses the motor 2, a tubular front housing 13 that mainly houses the spindle 3, and a central housing 14 that is disposed between the rear housing 12 and the front housing 13. A front end portion of the central housing 14 has a partition wall 141. The driving axis A1 intersects the partition wall 141. The central housing 14 and the front housing 13 are fixed to the rear housing 12 by screws, so that the three housings are integrated together as the body housing 11.

The rear housing 12 mainly houses the motor 2. An output shaft 23 of the motor 2 extends in parallel to the spindle 3 below the spindle 3. Thus, a rotational axis of the output shaft 23 is parallel to the driving axis A1. Bearings 231 and 233 rotatably support front and rear end portions of the output shaft 23, respectively. The front bearing 231 is supported by the partition wall 141. The rear housing 233 is supported by a rear end portion of the rear housing 12. A front end portion of the output shaft 23 protrudes forward into the front housing 13 through a through hole formed in the partition wall 141. A pinion gear 24 is fixed around the front end portion of the output shaft 23.

Figure 2:
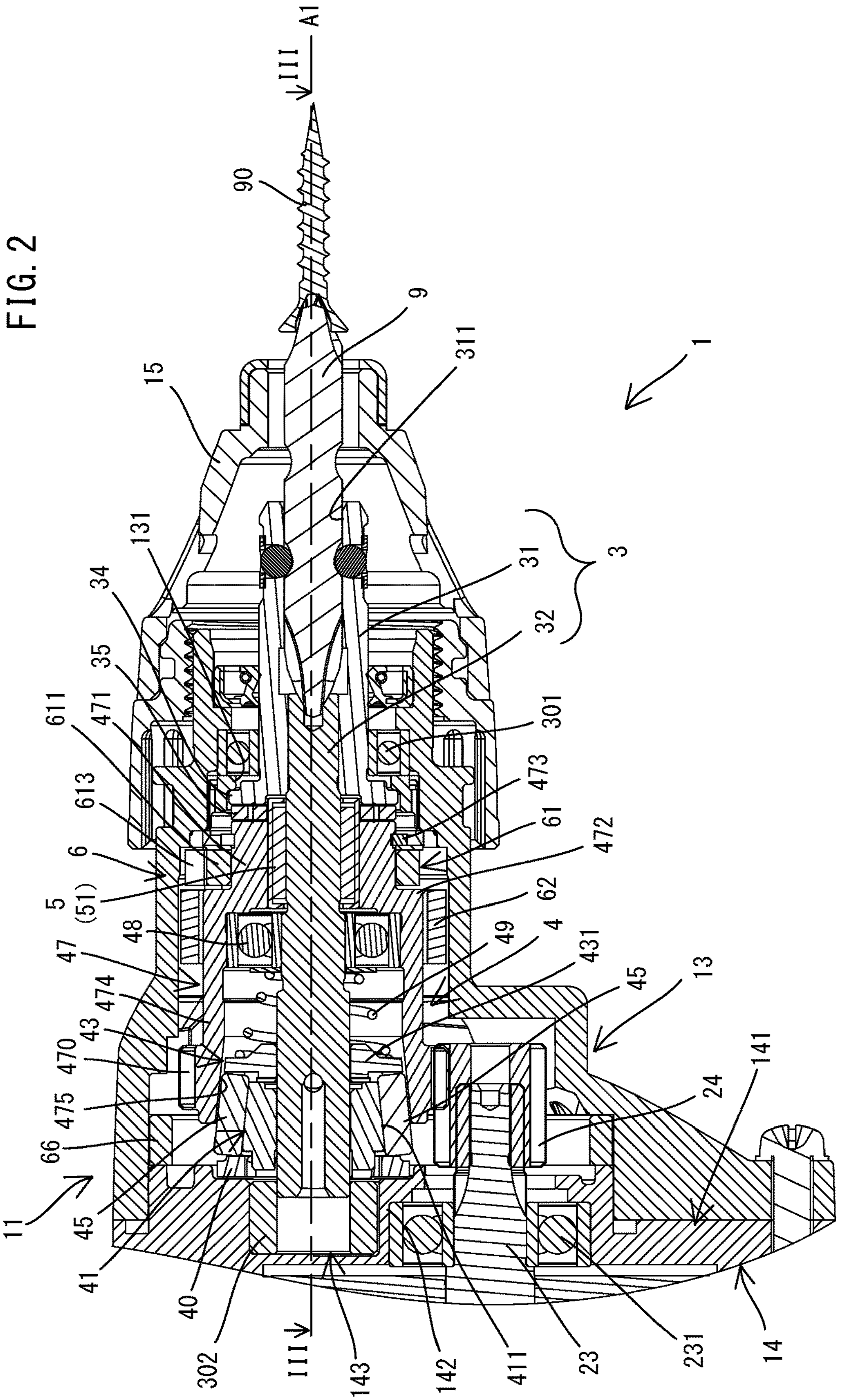
FIG. 2 is a partial, enlarged view of FIG. 1.
Figure 3:
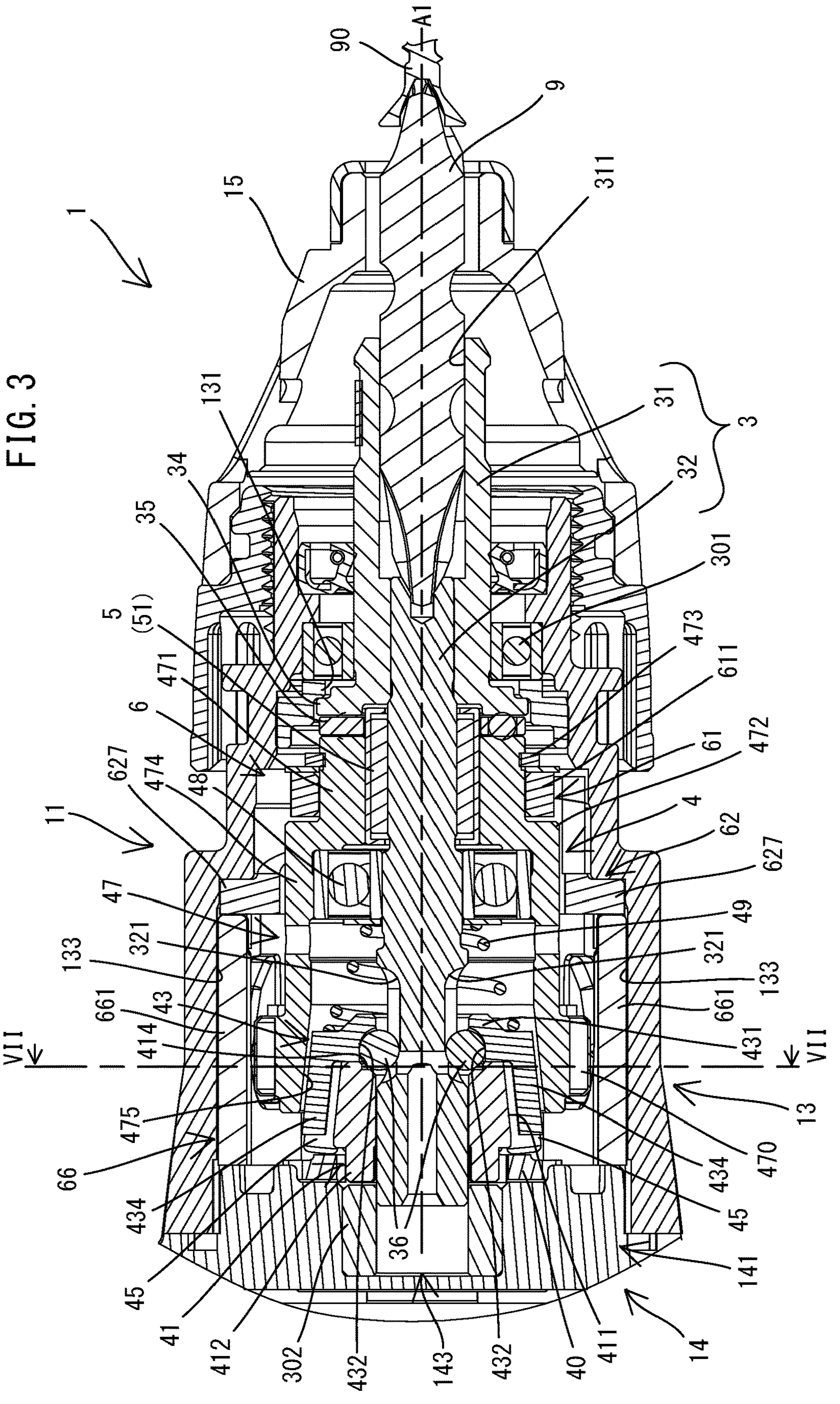
FIG. 3 is a sectional view taken along line III-III in FIG. 2.

As shown in FIGS. 2 and 3, the front housing 13 mainly houses the spindle 3, a first clutch 4 and a second clutch 5.

The spindle 3 is basically an elongate member (or a shaft) shaped like a solid circular cylinder (round bar/rod). The spindle 3 extends in the front-rear direction along the driving axis A1. In the present embodiment, two members (a front shaft 31 and a rear shaft 32), which are separately formed, are fixedly connected to each other and integrated together to form the spindle 3. The spindle 3 may, however, be constituted by a single shaft. A flange 34 is provided on a central portion of the spindle 3 in the front-rear direction.

Bearings 301 and 302 support front and rear end portions of the spindle 3, so that the spindle 3 is rotatable around the driving axis A1 and is movable (slidable) along the driving axis A1 in the front-rear direction. The front bearing 301 is a ball bearing and is supported by a front end portion of the front housing 13. The rear bearing 302 is a sliding bearing (also referred to as a plain bearing, or a bush). The bearing 302 is press-fitted into and thus supported in a recess (hereinafter, referred to as a bearing housing part 143, see FIG. 5) defined by a front surface of the partition wall 141 and a hollow cylindrical part 142 that protrudes forward from the front surface of the partition wall 141.

The spindle 3 is always biased forward, as will be described in detail later. In an initial state in which an external rearward force is not applied to the spindle 3, the spindle 3 is held in a position where a front end surface of the flange 34 is in contact with a stopper part 131 provided within the front housing 13. The position of the spindle 3 at this time is a foremost position (also referred to as an initial position) within a movable range of the spindle 3.

A tubular locator 15 is removably mounted around the front end portion of the front housing 13 so as to cover the front end portion of the front housing 13. The front end portion of the spindle 3 protrudes from the front housing 13 into the locator 15. A bit-insertion hole 311 is formed in the front end portion of the spindle 3. The driver bit 9 is held such that a rear portion of the driver bit 9 is inserted into the bit-insertion hole 311. The user can fix the locator 15 in any position by moving the locator 15 relative to the front housing 13 in the front-rear direction. Accordingly, an amount of protrusion of the driver bit 9 from the locator 15, i.e., a tightening depth of the screw 90, is set.

Each of the first clutch 4 and the second clutch 5 is configured to selectively transmit power from the output shaft 23 of the motor 2 to the spindle 3. The details of the first clutch 4 and the second clutch 5 will be described later.

Next, elements or structures disposed within the handle 17 are described.

As shown in FIG. 1, the handle 17 houses a main switch 174, a reversing switch 176, and a controller 178.

The main switch 174 is a switch for starting the motor 2 and is disposed in an upper portion of the grip part 171 behind the trigger 173. The main switch 174 is normally kept in an OFF state and switched to an ON state when the trigger 173 is depressed. The main switch 174 is connected to the controller 178 via wires, and configured to output a signal indicating the ON state or OFF state to the controller 178.

A reversing switch lever 175 is provided in a portion of the handle 17 that connects a lower end portion of the grip part 171 and a lower rear end portion of the body housing 11 (the rear housing 12). The reversing switch lever 175 is a manipulation member that is configured to switch a rotational direction of the motor 2 (more specifically, a rotational direction of the output shaft 23) and is operably coupled to the reversing switch 176. By manipulating the reversing switch lever 175, the user can set the rotational direction of the motor 2 to either one of a normal direction (or a screw-tightening direction) and a reverse direction (or a screw-loosening direction). When the motor 2 is rotated in the normal direction, the driver bit 9 tightens the screw. When the motor 2 is rotated in the reverse direction, the driver bit 9 loosens the screw 90. The reversing switch 176 is connected to the controller 178 via wires. The reversing switch 176 is configured to output a signal to the controller 178 that corresponds to the rotational direction set via the reversing switch lever 175.

The controller 178 is disposed below the main switch 174 within the grip part 171. The controller 178 includes a control circuit that is configured to control the driving of the motor 2. When the main switch 174 is in the ON state, the controller 178 rotationally drives the motor 2 in the normal direction or in the reverse direction, according to the rotational direction indicated by the signal from the reversing switch 176.

The detailed structure of the first clutch 4 is now described.

As shown in FIGS. 2 and 3, the first clutch 4 is operably coupled to the output shaft 23 and to the spindle 3. Thus, the first clutch 4 is disposed in a power-transmitting path between the output shaft 23 and the spindle 3. The first clutch 4 is configured to selectively transmit power from the output shaft 23 to the spindle 3, depending on the position of the spindle 3 in the front-rear direction.

The first clutch 4 of the present embodiment also functions (serves) as a speed-reducing mechanism. Specifically, the first clutch 4 is structured as a planetary-gear speed-reducing mechanism that includes a tapered sleeve 41, a retainer 43, a plurality of rollers 45 and a gear sleeve 47.

The tapered sleeve 41, the retainer 43 and the gear sleeve 47 are arranged coaxially with the spindle 3 (i.e., along the driving axis A1). The tapered sleeve 41, the retainer 43, the rollers 45 and the gear sleeve 47 correspond to a sun member, a carrier, planetary members and a ring member of the planetary-gear speed-reducing mechanism, respectively. In the first clutch 4, the tapered sleeve 41, the gear sleeve 47 and the retainer 43 serve as a fixed element, an input element and an output element, respectively. Thus, the gear sleeve 47 and the retainer 43 (and the spindle 3) rotate in the same direction.

In the following description, the rotational direction of the gear sleeve 47, the retainer 43 and the spindle 3 when the motor 2 (the output shaft 23) is rotationally driven in the normal direction (the screw-tightening direction) is referred to as a normal direction (a screw-tightening direction) of the gear sleeve 47, the retainer 43 and the spindle 3. The rotational direction of the gear sleeve 47, the retainer 43 and the spindle 3 when the motor 2 is rotationally driven in the reverse direction (the screw-loosening direction) is referred to as a reverse direction (a screw-loosening direction) of the gear sleeve 47, the retainer 43 and the spindle 3. The rotational direction of the output shaft 23 is always opposite to the rotational direction of the gear sleeve 47, the retainer 43 and the spindle 3.

Figure 4:
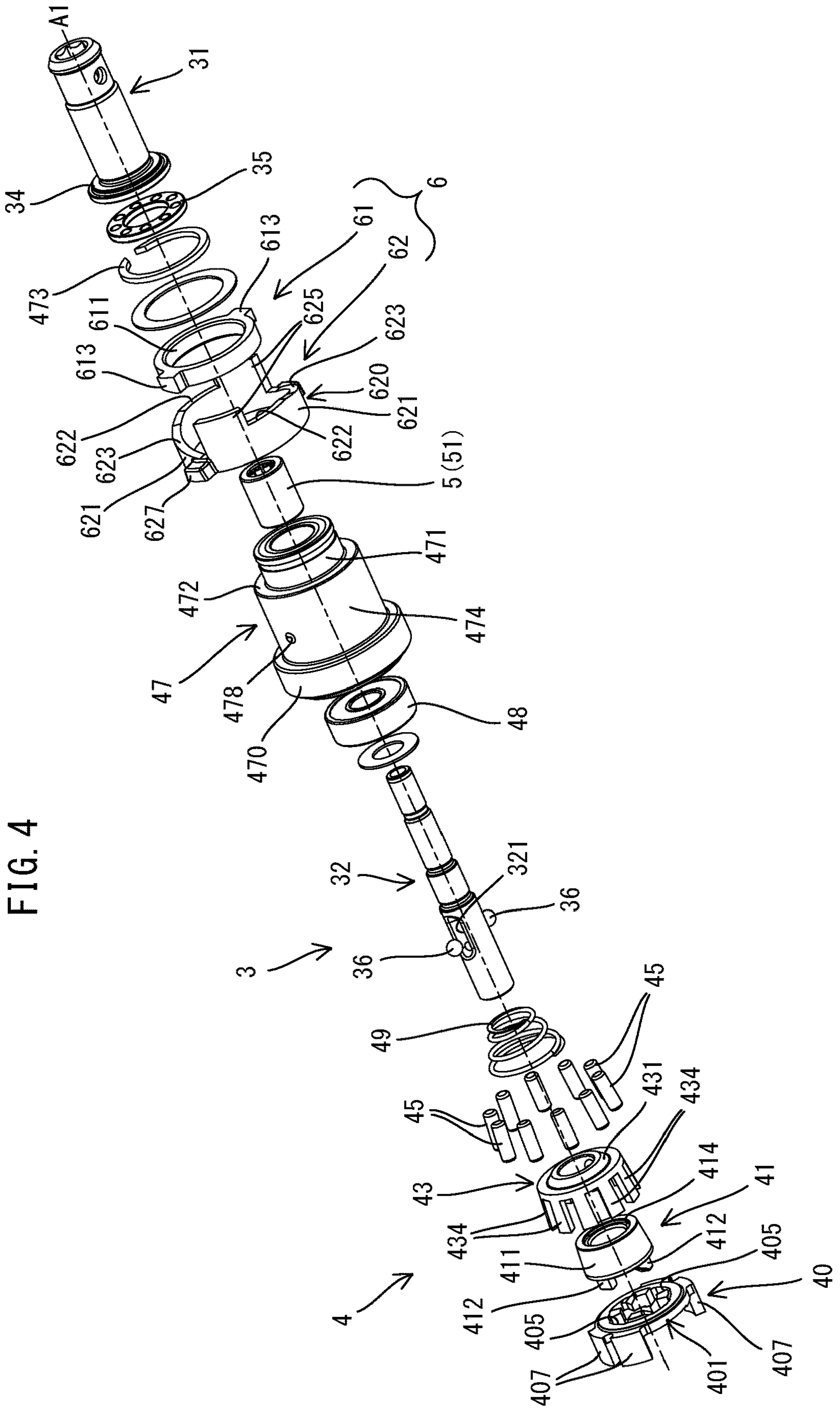
FIG. 4 is an exploded perspective view showing the spindle, a first clutch and a second clutch.

As shown in FIGS. 2 to 4, the tapered sleeve 41 is a tubular member. The tapered sleeve 41 is supported by the body housing 11 via a base 40.

Figure 5:
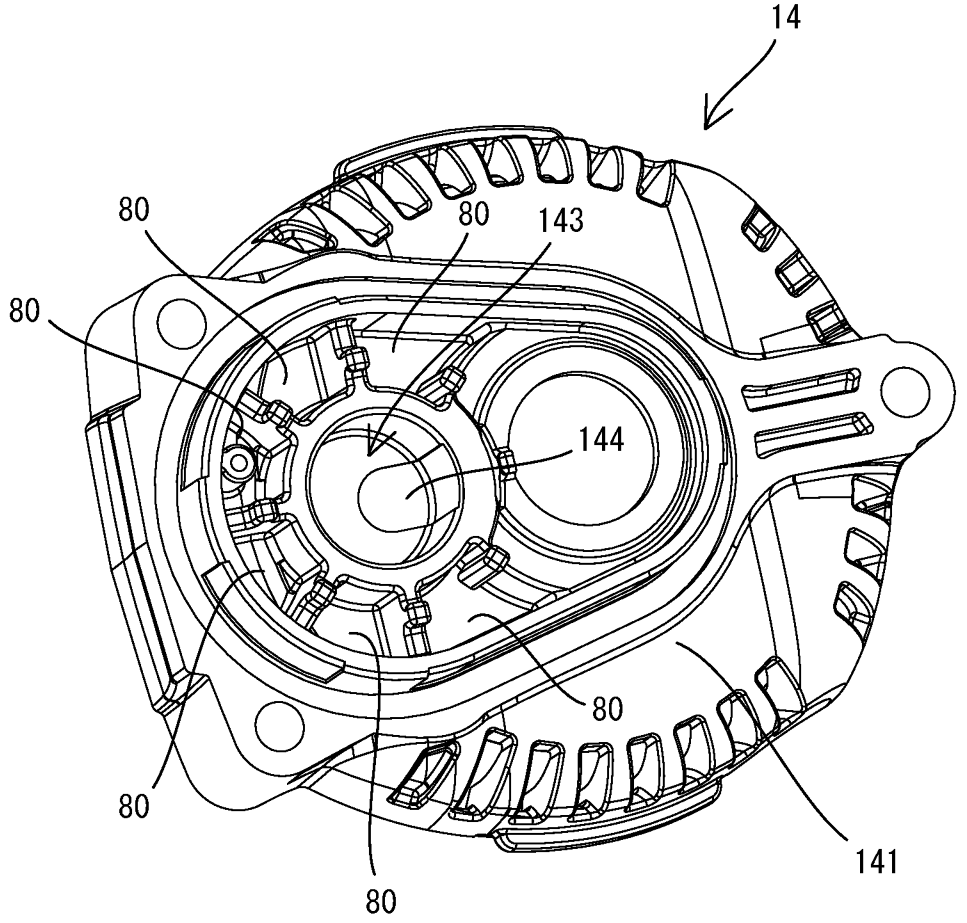
FIG. 5 is a perspective view of a central housing as viewed from front.
Figure 6:
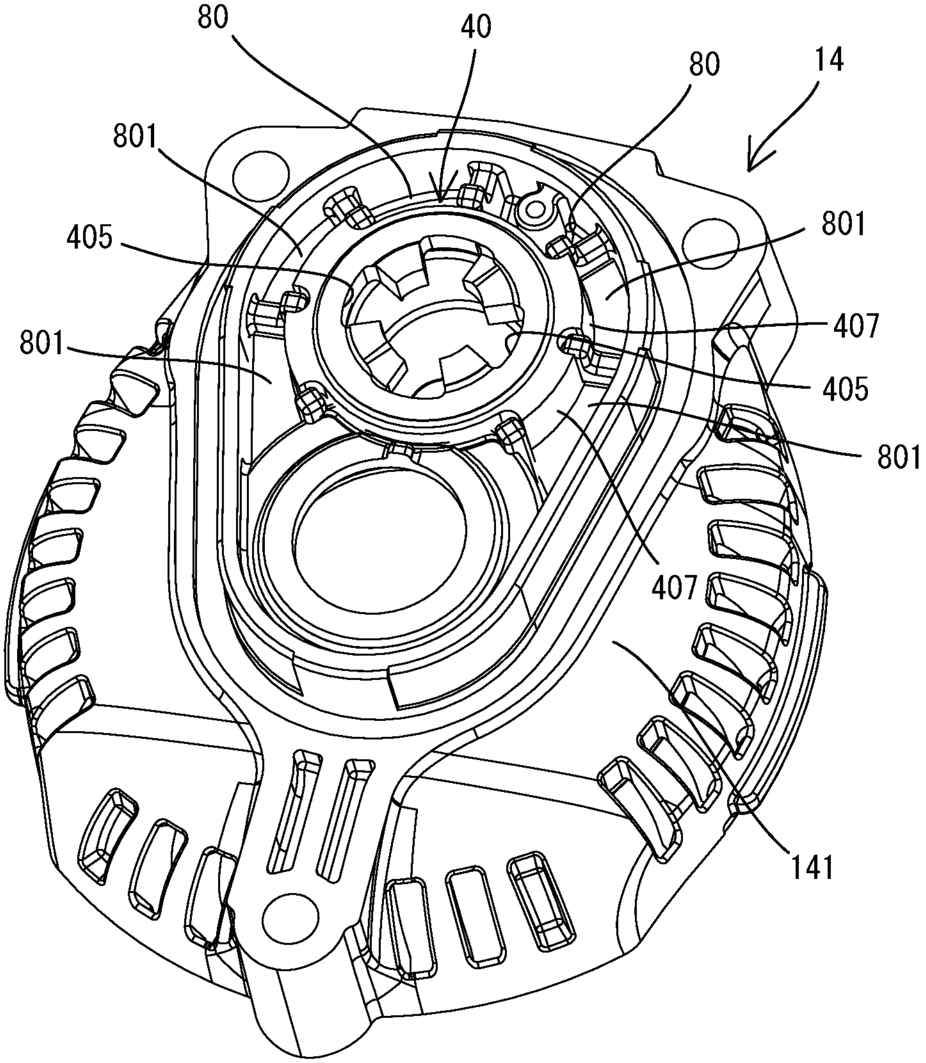
FIG. 6 is a perspective view of the central housing with a base and a felt fitted therein as viewed from front.

The base 40 is formed as a member that is originally separate (discrete) from the body housing 11. The base 40 is coupled to the body housing 11 (specifically, the partition wall 141) to be coaxial with the driving axis A1. More specifically, the base 40 includes an annular part 401 and four legs 407 that protrude rearward from a peripheral edge portion of the annular part 401. As shown in FIG. 5, recesses 80 that are defined by ribs are disposed around the cylindrical part 142 that surrounds (defines) the bearing housing part 143. As shown in FIG. 6, the legs 407 of the base 40 are fitted into the recesses 80, respectively. Thus, the base 40 is held by the body housing 11 (the partition wall 141) while rotation of the base 40 around the driving axis A1 is restricted.

In the present embodiment, the recess 80 also serves as a reservoir (oil reservoir) for lubricant (for example, grease or lubrication oil). A felt 801 that absorbs and retains the lubricant is fitted in each recess 80. Gaps (see FIG. 15) are formed within the recess 80 between a rear end (a protruding end) of the leg 407 and a bottom surface of the recess 80 and between a radially inner surface of the leg 407 and an outer peripheral surface of the cylindrical portion 407, respectively. Portions of the felt 801 are disposed in the gaps, respectively.

As shown in FIGS. 2 to 4, the rear end of the tapered sleeve 41 has protrusions 412. The protrusions 412 are fitted into recesses 405 formed on an inner peripheral surface of the base 40, respectively. Thus, the tapered sleeve 41 is held by the body housing 11 (the partition wall 141) via the base 40 while rotation of the tapered sleeve 41 around the driving axis A1 is restricted. An outer peripheral surface of the tapered sleeve 41 is structured as a tapered surface 411 that is inclined (oblique) relative to the driving axis A1 by a specified angle. More specifically, the tapered sleeve 41 has a truncated conical outer shape that is tapered forward (having a diameter decreasing toward the front). The tapered surface 411 is thus structured as a conical surface that is inclined forward toward the driving axis A1.

The retainer 43 is configured to rotatably retain the rollers 45. The retainer 43 in the present embodiment includes an annular part 431 and retaining arms 434.

The annular part 431 is a wall part having a through hole at its center. The retaining arms 434 are spaced apart from each other in a circumferential direction and protrude generally rearward from a rear surface of a peripheral edge portion of the annular part 431. Each of the retaining arms 434 extends substantially at the same inclination angle as the tapered surface 411 of the tapered sleeve 41 relative to the driving axis A1 (in other words, in parallel to the tapered surface 411). A space between the retaining arms 434 adjacent to each other in the circumferential direction serves as a retaining space for the roller 45. A front end of this space is closed by the peripheral edge portion of the annular part 431.

In the present embodiment, the retainer 43 is supported by the spindle 3 not to be rotatable and to be movable in the front-rear direction relative to the spindle 3, while the retaining arms 434 are disposed radially outward of the tapered sleeve 41. More specifically, as shown in FIGS. 3 and 4, two grooves 321 are formed across the driving axis A1 in a rear end portion of the spindle 3 (the shaft 32). Each of the grooves 321 extends linearly in the front-rear direction. A ball 36 is rollably disposed in each of the grooves 321. Further, two recesses 432 are formed across the driving axis A1 in an inner peripheral surface of the annular part 431 of the retainer 43. A portion of the ball 36 disposed in the groove 321 is engaged with the recess 432. Furthermore, an annular recess 414 is formed in the center of a front end surface of the tapered sleeve 41. The retainer 43 is biased rearward by a biasing spring 49 and held such that the balls 36 are each arranged within a space defined by the recesses 414 and 432, and a rear surface of the annular part 431 is in contact with the front end surface of the tapered sleeve 41, as will be described in detail later.

Owing to such a structure, the retainer 43 is engaged with the spindle 3 via the balls 36 so as to be rotatable together with the spindle 3 (i.e., rotationally engaged with the spindle 3 via the balls 36). Further, the balls 36 can roll within the annular recess 419 of the tapered sleeve 41, and the retainer 43 can rotate around the driving axis A1 together with the spindle 3 relative to the tapered sleeve 41. The spindle 3 can move in the front-rear direction relative to the retainer 43 and the tapered sleeve 41 within the range in which the balls 36 can roll within the corresponding grooves 321.

Figure 7:
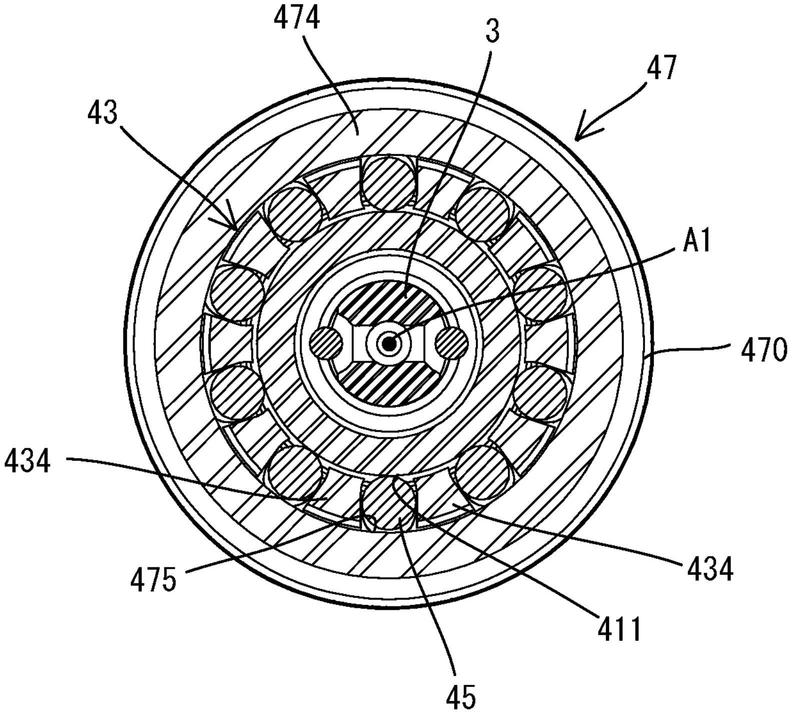
FIG. 7 is a sectional view taken along line VII-VII in FIG. 3, for illustrating an interruption state of the first clutch (wherein a front housing and a retainer are not shown).

As shown in FIGS. 2 to 4, each of the rollers 45 is a circular columnar member. Each of the rollers 45 has a constant diameter and is rotatably retained between the adjacent retaining arms 434. As shown in FIG. 7, an outer peripheral surface of the roller 45 partially and slightly protrudes from inner and outer surfaces of the retaining arms 434 in the radial direction of the retainer 43.

As shown in FIGS. 2 to 4, the gear sleeve 47 is basically structured as a hollow cylindrical member with a stepped portion. More specifically, a front end portion of the gear sleeve 47 has an inner diameter and an outer diameter that are smaller than those of a portion of the gear sleeve 47 extending rearward from the front end portion. In the following description, the front end portion of the gear sleeve 47 is referred to as a small-diameter part 471, and the portion of the gear sleeve 47 extending rearward from the front end portion is referred to as a large-diameter part 474. Further, the stepped portion connecting the small-diameter part 471 and the large-diameter part 474 is referred to as a shoulder part 472. Each of the small-diameter part 471 and the large-diameter part 474 is a cylindrical tubular wall having an inner diameter larger than the diameter of the spindle 3.

An outer ring of a bearing (specifically, a ball bearing) 48 is fixed onto an inner peripheral surface of a front end portion of the large-diameter part 474 (a portion adjacent to the shoulder part 472). The spindle 3 is inserted into an inner ring of the bearing 48. Thus, the gear sleeve 47 is supported by the spindle 3 to be rotatable around the driving axis A1 relative to the spindle 3.

A space is formed behind the bearing 48 and between the spindle 3 and the large-diameter part 474 (the tubular wall) in the radial direction. Portions of the tapered sleeve 41, the retainer 43 and the rollers 45 are arranged in this space. Further, gear teeth 470 are integrally formed on an outer periphery of a rear end portion of the gear sleeve 47 (specifically, the large-diameter part 474). The gear teeth 470 are always engaged with the pinion gear 24. Thus, the gear sleeve 47 is rotationally driven in response to rotation of the output shaft 23, in a direction opposite to the output shaft 23.

As shown in FIGS. 2 and 3, an inner peripheral wall of the rear end portion of the large-diameter part 474 of the gear sleeve 47 has a tapered surface 475. The tapered surface 475 is inclined (oblique) relative to the driving axis A1, substantially at the same angle as the tapered surface 411 of the tapered sleeve 41 (in other words, extends in parallel to the tapered surface 411). Thus, the tapered surface 475 is structured as a conical surface that is inclined rearward (toward the open end of the gear sleeve 47) and away from the driving axis A1. A front portion of each of the rollers 45 retained by the retainer 43 is between the tapered surface 411 and the tapered surface 475 in the radial direction of the spindle 3 (in the direction orthogonal to the driving axis A1).

The first clutch 4 includes the biasing spring 49 that is disposed between the gear sleeve 47 and the retainer 43 (specifically, between the bearing 48 and the retainer 43) in the front-rear direction. In the present embodiment, the biasing spring 49 is a conical coil spring. Alternatively, other type of spring may be employed. The biasing spring 49 always biases the retainer 43 and the gear sleeve 47 away from each other, that is, rearward and forward, respectively. Thus, movement of the tapered sleeve 41, the retainer 43 and the rollers 45 in the front-rear direction is restricted, and thus the tapered sleeve 41, the retainer 43 and the rollers 45 are held in their specified positions.

A thrust bearing 35 is disposed between a front surface of the gear sleeve 47 (the small-diameter part 471) and the flange 34 of the spindle 3 in the front-rear direction. Since the gear sleeve 47 is biased forward by the biasing force of the biasing spring 49, the spindle 3 is also biased forward via the thrust bearing 35. Thus, in the initial state, the spindle 3 is held in the foremost position (the initial position). The gear sleeve 47 moves in the front-rear direction along with the movement of the spindle 3 in the front-rear direction. Thus, the gear sleeve 47 and the spindle 3 move integrally with each other in the front-rear direction relative to the body housing 11.

The first clutch 4 having the above-described structure transmits the power using a frictional force between the rollers 45 and the tapered sleeve 41 (the tapered surface 411) and a frictional force between the rollers 45 and the gear sleeve 47 (the tapered surface 475). In other words, the first clutch 4 of the present embodiment is structured as a so-called planetary-roller-type frictional clutch.

Positions of the spindle 3 and the gear sleeve 47 in the front-rear direction and operation of the first clutch 4 are now described.

When the spindle 3 is held in the initial position, as shown in FIGS. 2 and 7, the rollers 45 are loosely held between the tapered surface 411 of the tapered sleeve 41 and the tapered surface 475 of the gear sleeve 47 while the rollers 45 are allowed to move slightly. Thus, the first clutch 4 is incapable of transmitting the power of the motor 2 to the spindle 3 (this state is hereinafter referred to as an interruption state). Thus, even if the gear sleeve 47 is rotated in this state, the rotation of the gear sleeve 47 is not transmitted to the retainer 43.

Figure 8:
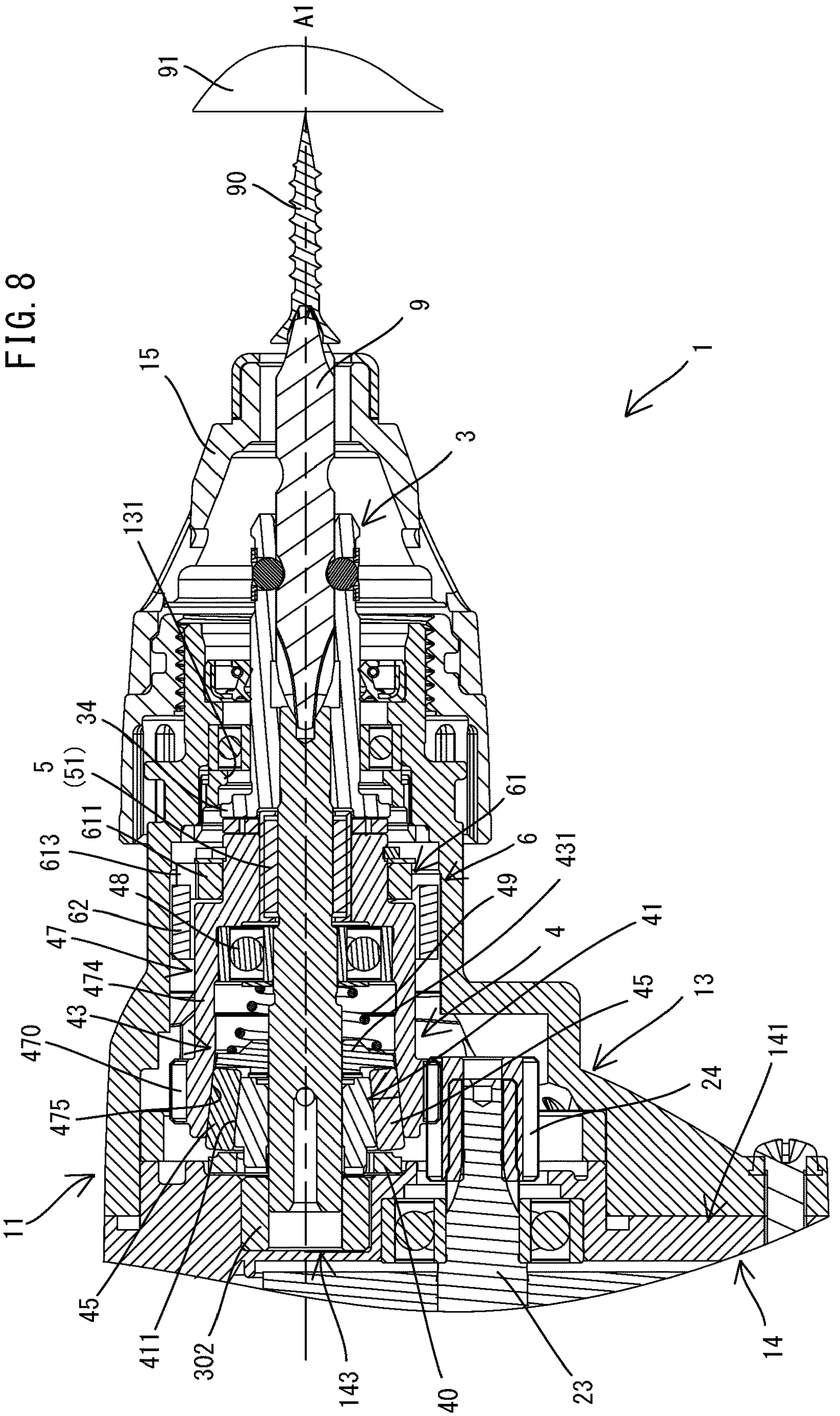
FIG. 8 is a partial, sectional view that corresponds to FIG. 7, wherein the spindle is at an activation position.

As shown in FIG. 8, when the user presses the screw 90, which is engaged with the driver bit 9, against the workpiece 91, the spindle 3 is pushed rearward relative to the body housing 11 against the biasing force of the biasing spring 49. The gear sleeve 47 is also moved rearward integrally with the spindle 3 relative to the body housing 11, the tapered sleeve 41, the retainer 43 and the rollers 45. The gear sleeve 47 moves rearward toward the tapered sleeve 41, and the distance between the tapered surface 411 of the tapered sleeve 41 and the tapered surface 475 of the gear sleeve 47 in the radial direction gradually decreases.

Figure 9:
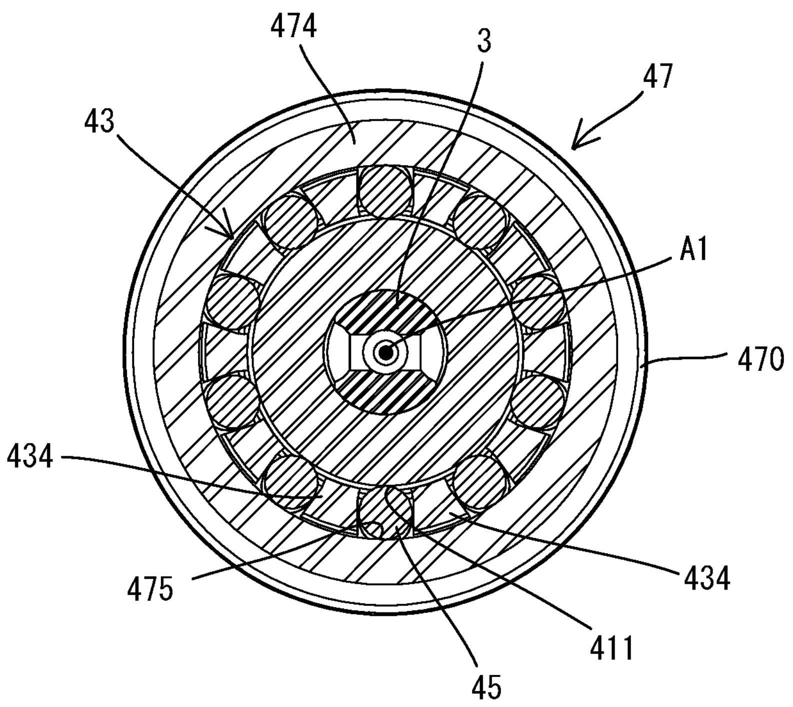
FIG. 9 is a sectional view that corresponds to FIG. 3, for illustrating a transmission state of the first clutch.
Figure 10:
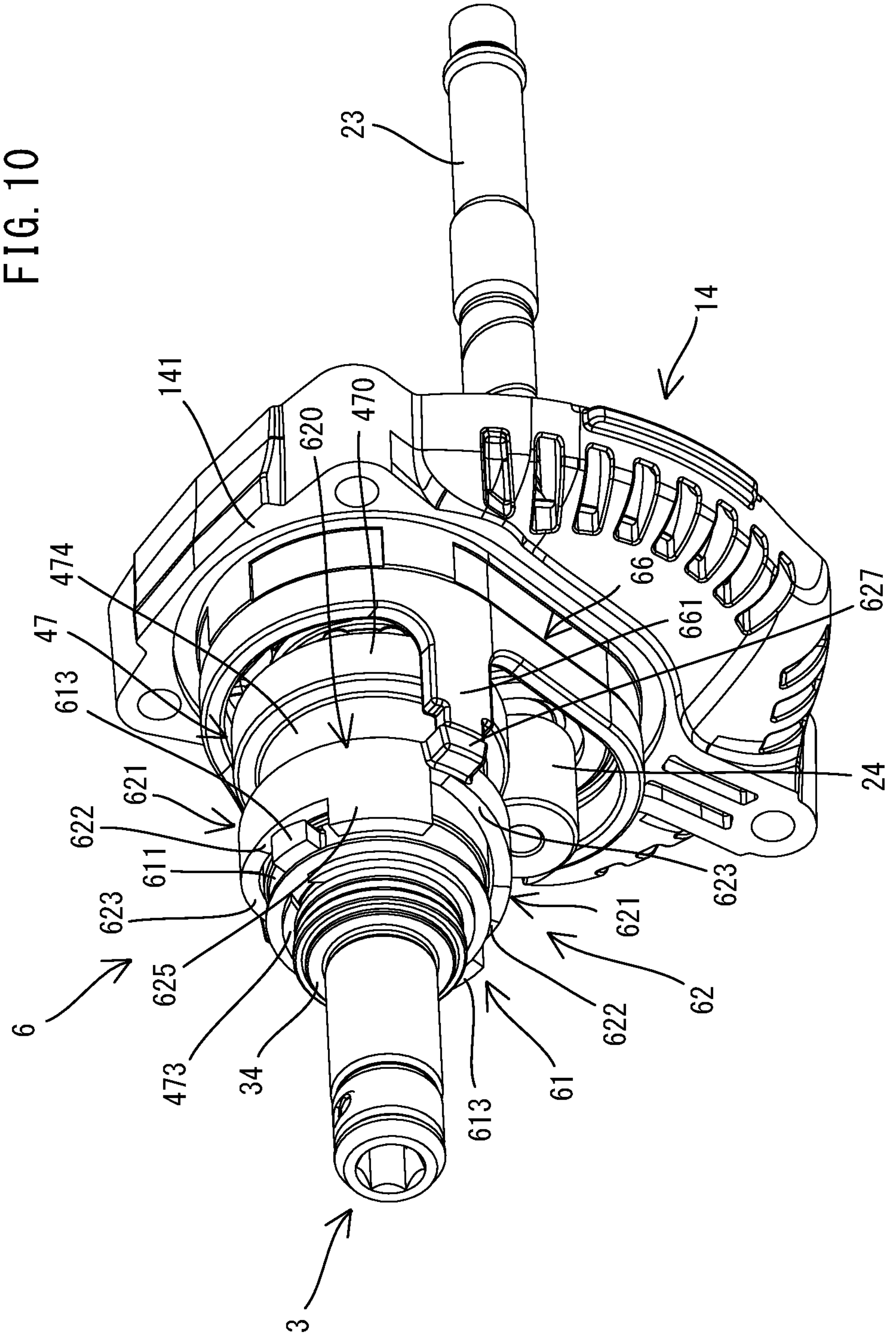
FIG. 10 is a perspective view of a structure in the front housing.

Along with the rearward movement of the spindle 3 and the gear sleeve 47, as shown in FIGS. 8 and 9, the rollers 45 come into frictional contact with the tapered surface 411 and the tapered surface 475. When the frictional force increases and reaches a threshold, the rollers 45 revolve while rotating in response to rotation of the gear sleeve 47. The rollers 45 cause the retainer 43 and the spindle 3 to rotate in the same direction as the gear sleeve 47. In this manner, the state of the first clutch 4 shifts from the interruption state to a transmission state, in which the first clutch 4 is capable of transmitting power to the spindle 3. In the following description, the positions of the spindle 3 and the gear sleeve 47 in the front-rear direction at this time are referred to as their activation positions. Since the first clutch 4 is a speed-reducing mechanism, the rotation speed of the spindle 3 is slower than the rotation speed of the gear sleeve 47.

The first clutch 4 of the present embodiment is configured to transmit the power from the output shaft 23 to the spindle 3 only when the motor 2 is rotationally driven in the normal direction (the screw-tightening direction). In other words, the first clutch 4 is incapable of shifting from the interruption state to the transmission state when the motor 2 is rotationally driven in the reverse direction (the screw-loosening direction), as will be described in detail later.

The detailed structure of the second clutch 5 is now described.

As shown in FIGS. 2 to 4, the second clutch 5 is operably coupled to the output shaft 23 and to the spindle 3. Thus, the second clutch 5 is disposed in the power-transmitting path between the output shaft 23 and the spindle 3. Unlike the first clutch 4, the second clutch 5 is configured to transmit the power from the output shaft 23 to the spindle 3 regardless of the position of the spindle 3 in the front-rear direction. Further, the second clutch 5 of the present embodiment is configured to transmit the power from the output shaft 23 to the spindle 3 only when the rotational direction of the motor 2 (the output shaft 23) is the reverse direction (the screw-loosening direction).

The second clutch 5 of the present embodiment is formed by a one-way clutch 51. The one-way clutch 51 is configured to transmit rotation only in one direction and to run idle (not to transmit rotation) in the other direction. The one-way clutch 51 of the present embodiment is a general one-way clutch that includes a hollow cylindrical outer ring and a plurality of rolling elements (clutch members) disposed inside the outer ring. Rollers (specifically, needle rollers) are employed as the rolling elements.

The one-way clutch 51 is disposed between the small-diameter part 471 of the gear sleeve 47 and the spindle 3 in the radial direction of the spindle 3. More specifically, the outer ring of the one-way clutch 51 is press-fitted into and fixed to an inner peripheral surface of the small-diameter part 471 of the gear sleeve 47. The spindle 3 is inserted into the one-way clutch 51.

When the motor 2 (the output shaft 23) is rotationally driven in the normal direction (the screw-tightening direction), the one-way clutch 51 rotates together with the gear sleeve 47, but runs idle (slips) relative to the spindle 3. In other words, when the motor 2 is rotationally driven in the normal direction, the one-way clutch 51 does not transmit the rotation of the gear sleeve 47 to the spindle 3. On the other hand, when the motor 2 is rotationally driven in the reverse direction (the screw-loosening direction), the one-way clutch 51 is locked to the spindle 3 and thus rotates integrally with the gear sleeve 47 and the spindle 3. In other words, when the motor 2 is rotationally driven in the reverse direction, the one-way clutch 51 transmits the rotation of the gear sleeve 47 to the spindle 3. The rotation speed of the gear sleeve 47 is the same with the rotation speed of the spindle 3.

Further, the screwdriver 1 includes a restricting mechanism 6 that is configured to selectively restrict movement of the spindle 3 and the gear sleeve 47 in the front-rear direction. More specifically, the restricting mechanism 6 allows the spindle 3 and the gear sleeve 47 to move in the front-rear direction when the motor 2 is rotationally driven in the normal direction (the screw-tightening direction), to thereby make the first clutch 4 operable. On the other hand, the restricting mechanism 6 restricts (blocks, prevents) the spindle 3 and the gear sleeve 47 from moving in the front-rear direction when the motor 2 is rotationally driven in the reverse direction (the screw-loosening direction), to thereby make the first clutch 4 inoperable. Thus, the restricting mechanism 6 is configured to switch the state of the first clutch 4 between an operable state and an inoperable state, depending on the rotational direction of the motor 2. The detailed structure of the restricting mechanism 6 is described below.

As shown in FIGS. 2 to 4, 10 and 11, the restricting mechanism 6 includes a rotating sleeve 61 and a restricting frame 62.

The rotating sleeve 61 is basically a hollow cylindrical (annular) member (i.e., a sleeve or a collar). More specifically, the rotating sleeve 61 includes a hollow cylindrical tubular wall 611 and two protrusions 613 that protrude radially outward from an outer peripheral surface of the tubular wall 611. The tubular wall 611 is disposed around the small-diameter part 471 of the gear sleeve 47 (in other words, fitted onto the outer circumference of the small-diameter part 471). The outer diameter of the tubular wall 611 is set such that the outer peripheral surface of the tubular wall 611 does not protrude from the outer peripheral surface of the large-diameter part 474 of the gear sleeve 47 in the radial direction. The two protrusions 613 are symmetrically arranged relative to an axis of the rotating sleeve 61 (i.e., the driving axis A1). Each of the protrusions 613 protrudes radially outward from the outer peripheral surface of the large-diameter part 474. A rear end surface of each of the protrusions 613 includes an inclined (oblique) surface 614 that is slightly inclined (oblique) relative to the circumferential direction (see FIG. 11).

The rotating sleeve 61 is configured such that, when an external force is not applied to the rotating sleeve 61 or the external force is small enough, the rotating sleeve 61 rotates together (co-rotates) with the gear sleeve 47 along with the rotation of the gear sleeve 47. The rotating sleeve 61 of the present embodiment is configured to rotate together with the gear sleeve 47 around the driving axis A1 relative to the body housing 11, owing to a frictional force between an inner peripheral surface of the rotating sleeve 61 (the tubular wall 611) and the outer peripheral surface of the gear sleeve 47 (the small-diameter part 471). When an external force that exceeds the frictional force causing the co-rotation of the rotating sleeve 61 is applied to the rotating sleeve 61, the rotating sleeve 61 and the gear sleeve 47 rotate relative to each other around the driving axis A1.

The rotating sleeve 61 is disposed between the shoulder part 472 of the gear sleeve 47 and a stopper ring 473 (and a washer) fixed around the gear sleeve 47 (the small-diameter part 471) in the front-rear direction. Thus, the rotating sleeve 61 is restricted from moving in the front-rear direction relative to the gear sleeve 61. Accordingly, the rotating sleeve 61 moves integrally with the gear sleeve 47 and the spindle 3 in the front-rear direction relative to the body housing 11.

The restricting frame 62 is supported by the body housing 11, such that the restricting frame 62 is substantially immovable relative to the body housing 11. The restricting frame 62 is configured to selectively restrict (block, prevent) the rotating sleeve 61 (and thus the spindle 3 and the gear sleeve 47) from moving in the front-rear direction relative to the body housing 11, depending on a rotational position of the rotating sleeve 61 (a circumferential position of the protrusion 613) relative to the body housing 11.

More specifically, the restricting frame 62 is basically a tubular member, having a diameter larger than that of the rotating sleeve 61. More specifically, the restricting frame 62 has a hollow cylindrical tubular wall 620, two protrusions 625 and two protrusions 627. The tubular wall 620 is disposed around and coaxially with the gear sleeve 47. The two protrusions 625 protrude forward from an front end of the tubular wall 620. The two protrusions 627 protrude radially outward from an outer peripheral surface of the tubular wall 620.

Figure 12:
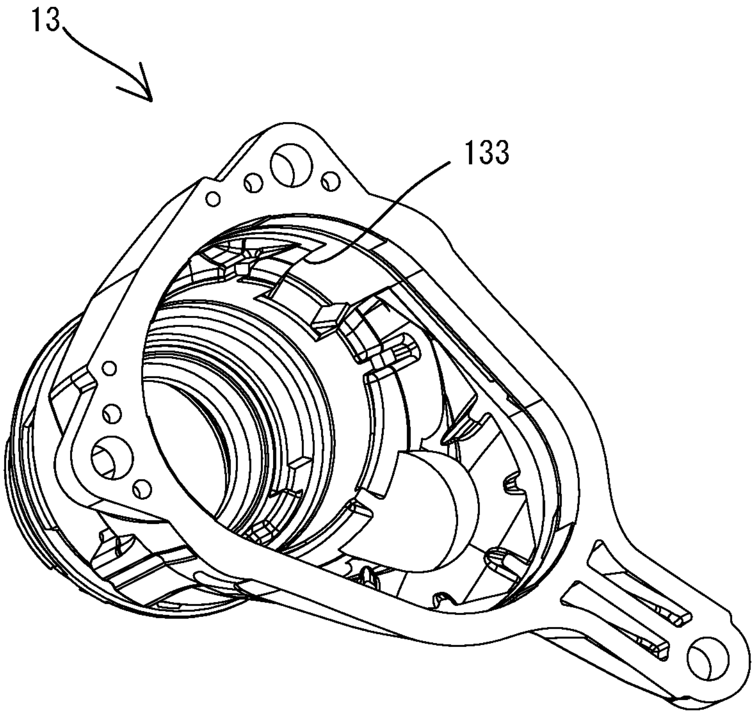
FIG. 12 is a perspective view of the front housing as viewed from behind.

As shown in FIGS. 3 and 12, two grooves 133 are formed in the front housing 13, corresponding to the two protrusions 627 of the restricting frame 62. Each of the grooves 133 extends in the front-rear direction and has a sectional shape that conforms to the protrusion 627. The two protrusions 627 are fitted into the two grooves 133, respectively. Each of the protrusions 627 is disposed between a surface that defines a front end of the groove 133 and a front end of an arm 661 of a holding member 66 (see FIG. 10) that is disposed in front of the partition wall 141. The protrusions 627 are thus held in position. Owing to this structure, the restricting frame 62 is held to be substantially immovable relative to the body housing 11. However, the restricting frame 62 may be directly fixed to the body housing 11 (the front housing 13) without the holding member 66.

The two protrusions 625 are symmetrically arranged relative to the driving axis A1, and protrude forward from the front end of the tubular wall 620. Thus, in the restricting frame 62, the two protrusions 625 and two portions without the protrusion 625 of the tubular wall 620 alternate in the circumferential direction. The portion without the protrusion 625 of the tubular wall 620 (hereinafter referred to as a restricting part 621) is positioned behind a rear end of the protrusions 613 of the rotating sleeve 61 in the front-rear direction when the spindle 3 and the gear sleeve 47 are at their initial positions. Each of the protrusions 625 of the restricting frame 62 protrudes forward of the rear end of the protrusion 613 of the rotating sleeve 61.

The position of a front end surface of the restricting part 621 in the front-rear direction varies along the circumferential direction of the tubular wall 620. More specifically, the front end surface of each restricting part 621 includes a first surface 622 (a flat surface) that is generally orthogonal to the driving axis A1, and a second surface 623 (an inclined (oblique) surface) that extends obliquely rearward (inclines/slopes rearward) in the circumferential direction from one end in the circumferential direction of the first surface 622. More specifically, the second surface 623 is connected to a forward side end of the first surface 622 in the normal direction (a direction indicated by arrow D1 in FIG. 11) of the gear sleeve 47 and inclines/slopes rearward toward (along) the normal direction. Each of the protrusions 625 is disposed between the first surface 622 of one of the two restricting parts 621 and the second surface 623 of the other one of the two restricting parts 621 in the circumferential direction of the restricting frame 62.

An inner diameter of the tubular wall 620 of the restricting frame 62 is larger than the outer diameter of the large-diameter part 474 of the gear sleeve 47. Thus, an inner peripheral surface of the tubular wall 620 is always spaced apart from the large-diameter part 474, and the gear sleeve 47 is rotatable around the driving axis A1 relative to the body housing 11 and the restricting frame 62 without interfering with the tubular wall 620. The inner diameter of the tubular wall 620 is smaller than a distance between protruding ends of the two protrusions 613 of the rotating sleeve 61 (i.e., smaller than the maximum diameter of the rotating sleeve 61). Thus, when the rotating sleeve 61 rotates relative to the restricting frame 62 due to the co-rotation, the protrusion 625 may interfere with the protrusion 613 of the rotating sleeve 61. Further, when the spindle 3 and the gear sleeve 47 move rearward from their initial positions, the restricting part 621 may interfere with the protrusion 613 of the rotating sleeve 61.

Figure 11:
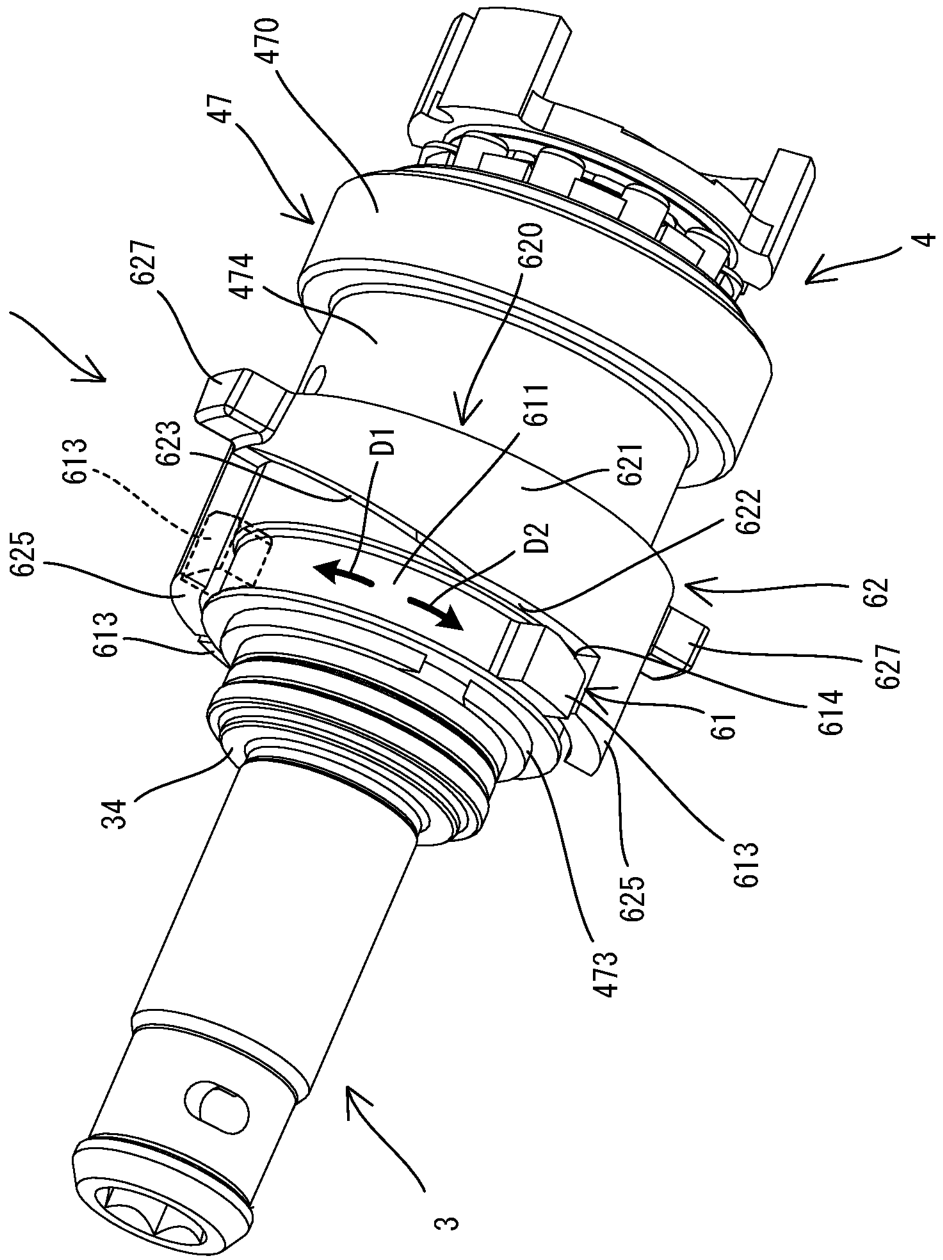
FIG. 11 is a perspective view showing the spindle, the first clutch and a restricting mechanism, wherein the spindle is at the initial position.

Specifically, as shown in FIG. 11, when the gear sleeve 47 rotates in the normal direction, which is indicated by arrow D1, the rotating sleeve 61 rotates in the same direction as the gear sleeve 47 due to the co-rotation, relative to the body housing 11 and the restricting frame 62. The rotating sleeve 61 can rotate to a position where each protrusion 613 comes into contact with the protrusion 625 at the forward side of the protrusion 613 in the normal direction, as shown by dotted lines in FIG. 11. The rotational position (the position in the circumferential direction) of the rotating sleeve 61 at this time is hereinafter referred to as a first position.

Figure 13:
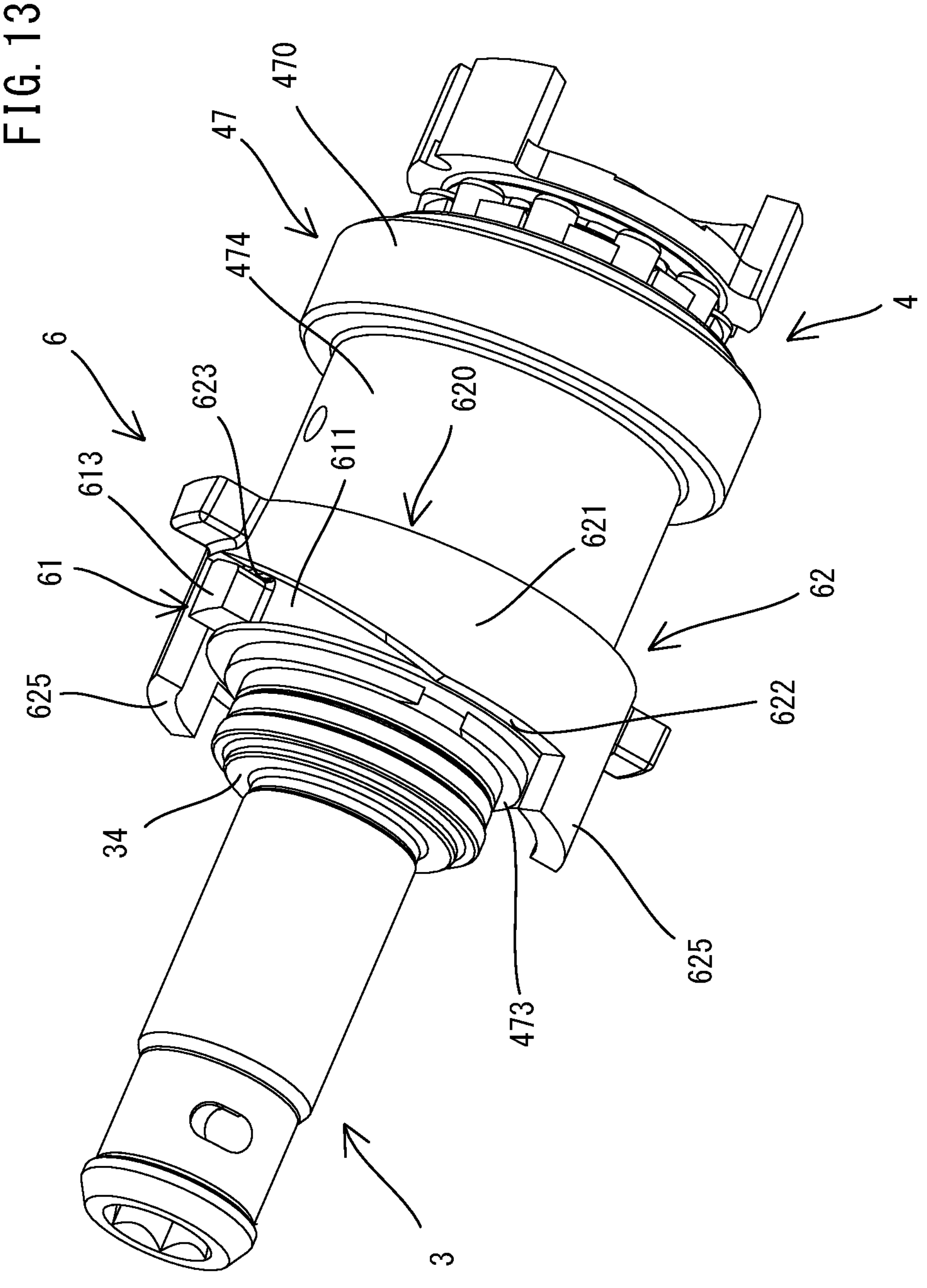
FIG. 13 is a perspective view showing the spindle, the first clutch and the restricting mechanism, wherein the spindle is at the activation position.

When the rotating sleeve 61 is at the first position, the protrusion 613 is directly in front of the forward side end portion of the second surface 623 of the restricting part 621 in the normal direction (the direction of arrow D1). When the spindle 3 is at the initial position, the protrusion 613 is spaced apart from the second surface 623 in the front-rear direction. Thus, as shown in FIG. 13, the rotating sleeve 61 can move rearward relative to the restricting frame 62. Accordingly, the restricting part 621 (specifically, the second surface 623) of the restricting frame 62 allows the spindle 3 to move rearward from the initial position when the rotating sleeve 61 is at the first position. The restricting part 62 (the second surface 623) is configured to allow the spindle 3 to move from the initial position to at least the activation position (i.e., to make the first clutch 4 operable).

When the gear sleeve 47 rotates in the reverse direction (the direction of arrow D2 in FIG. 11) while the spindle 3 is at the initial position, the rotating sleeve 61 rotates, due to the co-rotation, to a position where each protrusion 613 is in contact with the protrusion 625 at the forward side of the protrusion 613 in the reverse direction, as shown by solid lines in FIG. 11. The rotational position of the rotating sleeve 61 at this time is hereinafter referred to as a second position.

When the rotating sleeve 61 is at the second position, the protrusion 613 is directly in front of the first surface 622 of the restricting part 621. At this time, there is only a slight gap between the protrusion 613 and the first surface 622 in the front-rear direction. Thus, when the spindle 3 starts to move rearward from the initial position, the first surface 622 comes into contact with the protrusion 613 from behind, so that the rotating sleeve 61 prevents the spindle 3 from moving further rearward. In other words, when the rotating sleeve 61 is at the second position, the restricting part 621 (specifically, the first surface 622) restricts (blocks, prevents) the spindle 3 from moving rearward from the initial position (i.e., makes the first clutch 4 inoperable).

Operations of the restricting mechanism 6, the first clutch 4 and the second clutch 5 in the screw-tightening operation and in the screw-loosening operation are now described in detail.

First, the screw-tightening operation (i.e., an operation in which the motor 23 is rotationally driven in the normal direction (the screw-tightening direction)) is described.

As shown in FIG. 2, when the spindle 3 is held in the initial position, the first clutch 4 is in the interruption state.

In this state, when the user presses the trigger 173, the main switch 174 is turned ON and thus the controller 178 starts driving of the motor 2. The gear sleeve 47 is rotationally driven in the normal direction (the screw-tightening direction). As described above, at this time, the second clutch 2 (the one-way clutch 51) does not operate, so that the gear sleeve 47 runs idle relative to the spindle 3.

As described above, the rotating sleeve 61 of the restricting mechanism 6 is placed at the first position due to the co-rotation. As shown by the dotted lines in FIG. 11, since the protrusion 613 of the rotating sleeve 61 comes into contact with the protrusion 625 of the restricting frame 62, the rotating sleeve 61 is prevented from further rotating in the normal direction and the rotating sleeve 61 is thus held in the first position. The gear sleeve 47 continues to run idle in the normal direction relative to the spindle 3 while also rotating relative to the rotating sleeve 61.

Since the rotating sleeve 61 is held at the first position, the restricting part 621 (the second surface 623) allows the spindle 3 to move rearward without interfering with the protrusions 613 of the rotating sleeve 61. Thus, the first clutch 4 is operable. Accordingly, as shown in FIGS. 8 and 13, when the user presses the screw 90 against the workpiece 91, the spindle 3, the gear sleeve 47 and the rotating sleeve 61 move rearward relative to the body housing 11 and the restricting frame 62. When the spindle 3 reaches the activation position, the first clutch 4 shifts from the interruption state to the transmission state, thereby starting tightening the screw 90 into the workpiece 91.

When the operation of tightening the screw 90 into the workpiece 91 proceeds and a front end of the locator 15 comes into contact with the workpiece 91, a portion of the screwdriver 1 that is subjected to a pressing force shifts from the spindle 3 to the locator 15. Consequently, the pressing force applied to the spindle 3 gradually decreases. Thus, a clamping force applied to the rollers 45 from the tapered surface 411 of the tapered sleeve 41 and the tapered surface 475 of the gear sleeve 47, and thus the torque that is transmitted from the gear sleeve 47 to the spindle 3 also gradually decrease. When the torque that is transmitted from the gear sleeve 47 to the spindle 3 falls below the torque that is required for tightening the screw 90, the rotation of the spindle 3 is stopped. In this manner, the screw-tightening operation is finished.

Next, the screw-loosening operation (i.e., an operation in which the motor 2 is rotationally driven in the reverse direction (the screw-loosening direction)) is described.

When the user depresses the trigger 173 while the spindle 3 is at the initial position, the main switch 174 is turned ON, and the controller 178 starts driving of the motor 2. The gear sleeve 47 is rotationally driven in the reverse direction (the screw-loosening direction). As described above, the second clutch 5 (the one-way clutch 51) operates and thus the spindle 3 starts to rotate integrally with the gear sleeve 47 substantially at the same time as the gear sleeve 47 starts to rotate, to thereby starting loosening the screw 90. Thus, when the motor 2 is rotationally driven in the reverse direction, the user can loosen the screw 90 without pressing the screw 90 against the workpiece 91. Consequently, the user can start the screw-loosening operation immediately, by simply depressing the trigger 173.

The rotating sleeve 61 of the restricting mechanism 6 is placed at the second position as described above, due to the co-rotation. In a case in which the spindle 3 is pushed rearward and thus the protrusions 613 come into contact with the corresponding second surfaces 623 before the protrusions 613 reach their respective position directly in front of the first surfaces 622, the rotating sleeve 61 is led to the second position by the effect of the inclined second surfaces 623 (and the inclined surfaces 614 of the protrusions 613). As shown by the solid lines in FIG. 11, when the rotating sleeve 61 is placed at the second position, the protrusions 613 of the rotating sleeve 61 come into contact with the protrusions 625 of the restricting frame 62, respectively, so that the rotating sleeve 61 is prevented from further rotating in the reverse direction and thus the rotating sleeve 61 is held in the second position. The gear sleeve 47 continues to rotate integrally with the spindle 3 in the reverse direction while rotating relative to the rotating sleeve 61.

The screw 90 moves rearward as the screw 90 is loosened. Accordingly, the spindle 3 is pushed rearward. However, since the rotating sleeve 61 is held in the second position, the restricting parts 621 (the first surfaces 622) come into contact with the protrusions 613, respectively, and restrict (block, prevent) the spindle 3 from moving rearward. Accordingly, the first clutch 4 is kept inoperable and cannot be activated during the operation of the second clutch 5. Consequently, the power of the output shaft 23 is transmitted to the spindle 3 only via the second clutch 5, and the screw 90 is loosened and removed from the workpiece 91. As described above, since the first clutch 4 functions as a speed-reducing mechanism, if the first clutch 4 and the second clutch 5 operate at the same time, a slip may be caused in either one of the first clutch 4 and the second clutch 5, which may lead to false operation. However, the present embodiment can appropriately eliminate such false operation.

As described above, the screwdriver 1 transmits the power from the motor 2 to the spindle 3 via the first clutch 4 in the screw-tightening operation. On the other hand, the screwdriver 1 transmits the power from the motor 2 to the spindle 3 via the second clutch 5 in the screw-loosening operation. Thus, the power is transmitted through different paths between the screw-tightening operation and the screw-loosening operation. Further, since the first clutch 4 also serves as a speed-reducing mechanism, even if the rotation speed of the output shaft 23 of the motor 2 is the same (identical), the rotation speed of the spindle 3 when the power is transmitted via the first clutch 4 in the screw-tightening operation is different from the rotation speed of the spindle 3 when the power is transmitted via the second clutch 5 in the screw-loosening operation. Specifically, when the motor 2 is rotationally driven at the same rotation speed, the screw 90 is rotated at a higher speed in the screw-loosening operation than in the screw-tightening operation. The torque that is required in the screw-loosening operation is smaller than the torque that is required in the screw-tightening operation. Thus, operating efficiency in each of the screw-tightening operation and the screw-loosening operation can be optimized by setting different output rotation speeds (i.e., the rotation speeds of the spindle 3) with respect to the same input rotation speed (i.e., the rotation speed of the motor 2), depending on the rotational direction of the motor 2.

Further, since the first clutch 4, which operates only when the motor 2 is rotationally driven in the normal direction (the screw-tightening direction), also serves as a speed-reducing mechanism, the screwdriver 1 does not need to have a speed-reducing mechanism that is independent from the first clutch 4. Thus, the compact screwdriver 1 can be achieved. The torque that is required when the motor 2 is rotationally driven in the reverse direction (the screw-loosening direction) is relatively small. Thus, the second clutch 5 employs the one-way clutch 51 that simply transmits rotation without reducing the speed. Consequently, the second clutch 5 can be compact and relatively inexpensive.

The first clutch 4 starts to transmit the power in response to the rearward movement (push) of the spindle 3. The restricting mechanism 6 restricts the spindle 3 from moving in the front-rear direction only when the motor 2 (the output shaft 23) is rotationally driven in the reverse direction. Thus, the restricting mechanism 6 can reliably prevent activation of the first clutch 4 when the motor 2 (the output shaft 23) is rotationally driven in the reverse direction.

In the present embodiment, in particular, the restricting mechanism 6 is structured by the rotating sleeve 61 that is rotatable between the first position and the second position, and the restricting frame 62 that is fixed to the body housing 11 and that restricts the spindle 3 from moving in the front-rear direction only when the rotating sleeve 61 is at the second position. Since the rotating sleeve 61 can be rotated between the first position and the second position due to the co-rotation with the gear sleeve 47 that is rotated by the output shaft 23, the rotating sleeve 61 has a simple structure. Further, the restricting frame 62 (the restricting part 621) with the simple first surface 622 that abuts on the rotating sleeve 61 from behind can reliably prevent the spindle 3 from moving rearward.

Further, in the present embodiment, the restricting frame 62 has the protrusions 625 that are configured to respectively abut the protrusions 613 of the rotating sleeve 61 in the circumferential direction. Owing to this structure, the rotating sleeve 61 is prevented from co-rotating beyond the first position and beyond the second position without interrupting the rotation of the gear sleeve 47, and thus the rotating sleeve 61 can be held in the first position and the second position.

In the screwdriver 1, since various mechanisms and elements that require lubrication are disposed within the front housing 13, a lubricant (for example, grease or lubrication oil) is provided in the front housing 13. In the present embodiment, a circulation passage 8 for effectively circulating the lubricant is defined in the front housing 13. The circulation passage 8 is described in detail below.

Figure 14:
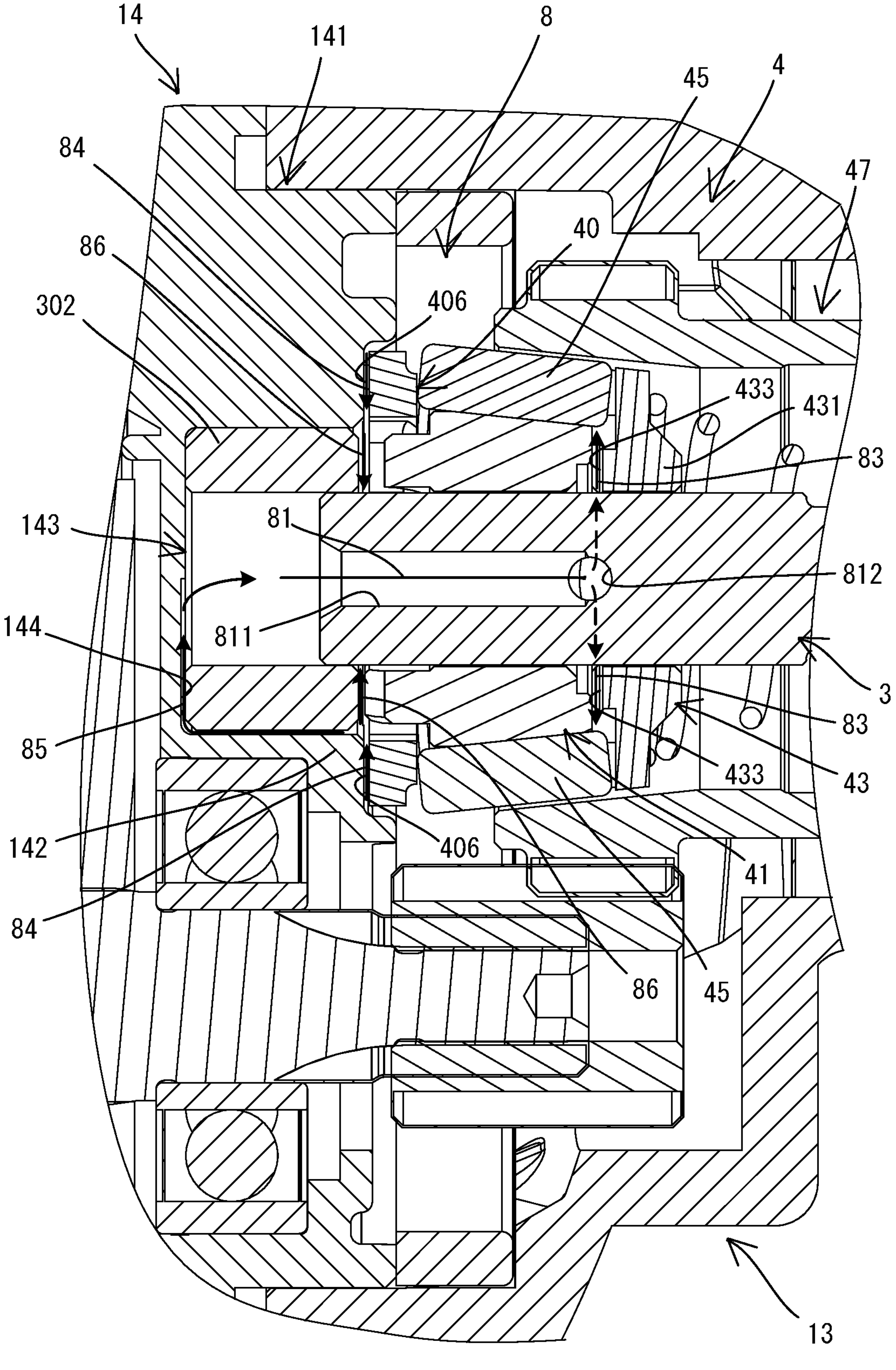
FIG. 14 is a partial, enlarged view of FIG. 2, for illustrating a circulation passage of a lubricant.
Figure 15:
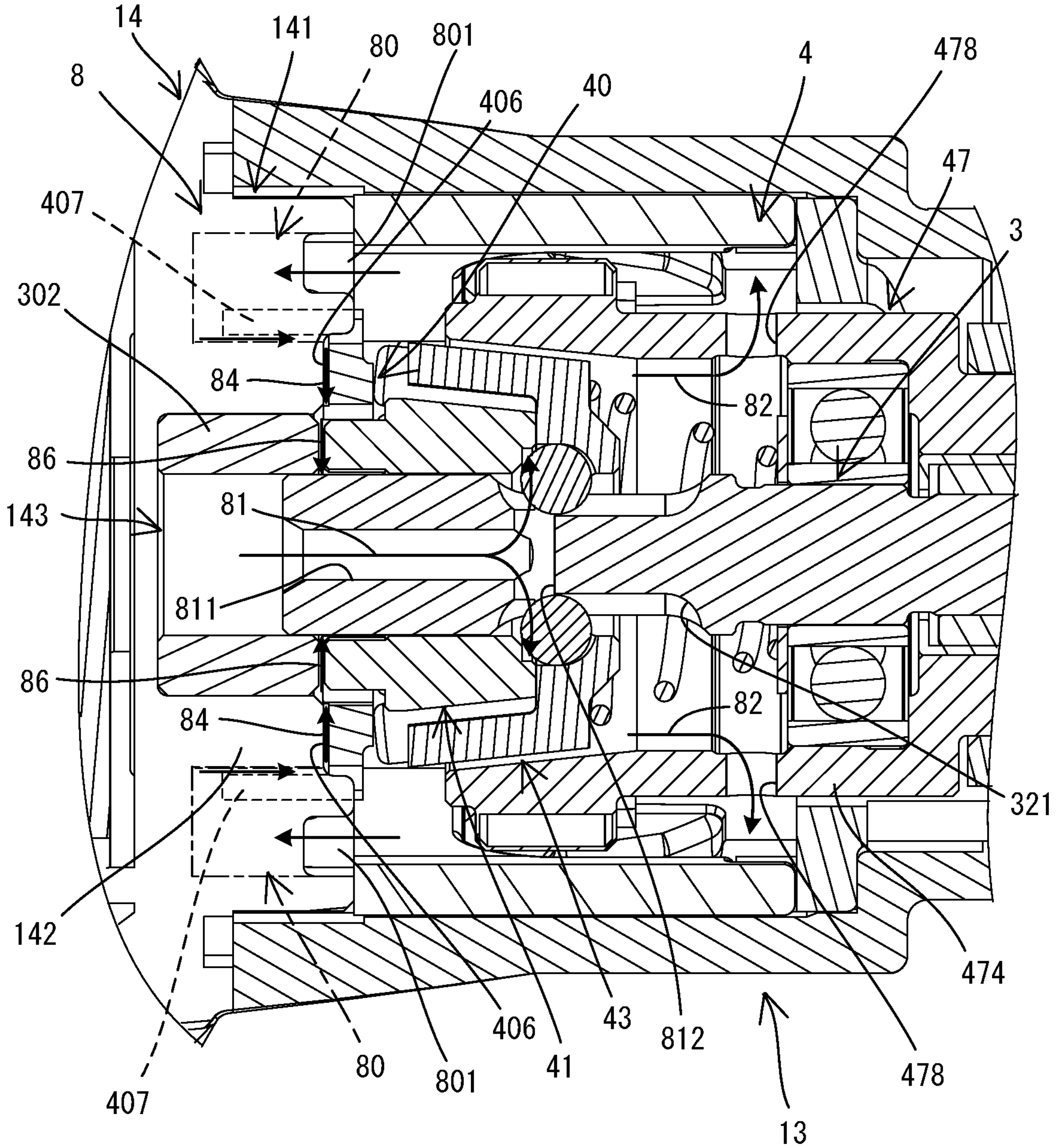
FIG. 15 is a partial, enlarged view of FIG. 3, for illustrating the circulation passage of the lubricant.

As shown in FIGS. 14 and 15, the circulation passage 8 includes a passage 81 that passes inside the spindle 3 and various passages 82 to 86 that are formed outside the spindle 3 to lead the lubricant to the rear end of the spindle 3.

The passage 81 inside the spindle 3 is defined by a first hole 811 and a second hole 812. The first hole 811 extends forward from the rear end of the spindle 3 along the axis of the spindle 3 (i.e., along the driving axis A1). The first hole 811 is a bottomed hole having a closed front end and an open rear end that opens at the rear end of the spindle 3. The second hole 812 extends through the spindle 3 along the diameter of the spindle 3. Both open ends of the second hole 812 are in the outer peripheral surface of the spindle 3 (into the grooves 321). The open ends of the second hole 812 are radially inside the first clutch 4 regardless of the position of the spindle 3 in the front-rear direction. A central portion of the second hole 812 communicates with a front end portion of the first hole 811. Thus, the first hole 811 and the second hole 812 together form a T-shape.

The lubricant that enters the first hole 811 from the rear end of the spindle 3 can flow out of the spindle 3 through the open ends of the second hole 812. More specifically, the lubricant passes through the passage 81 and is discharged radially outside the spindle 3 owing to the centrifugal force caused by rotation of the spindle 3. Consequently, the discharged lubricant can lubricate the elements (specifically, the first clutch 4) disposed in a region surrounding the spindle 3.

The passages 82 are configured to allow the lubricant, which has passed through the passage 81 and flowed outside the spindle 3, to flow radially out of the gear sleeve 47. Specifically, as shown in FIG. 15, two communication holes 478 are formed in the large-diameter part 474 of the gear sleeve 47. Each of the communication holes 478 extends through the large-diameter part 474 (the tubular wall) to communicate a space radially inside the large-diameter part 474 (an inner space of the gear sleeve 47) with a space radially outside the large-diameter part 474 (an outer space of the gear sleeve 47). Thus, the lubricant that has flowed out of the passage 81 and into the inner space of the gear sleeve 47 can flow radially outside the gear sleeve 47 through the communication holes 478. In particular, when the gear sleeve 47 is rotated, flows of air are generated through the communication holes 478 by the centrifugal force, and thus the lubricant can be effectively discharged outside the gear sleeve 47.

Figure 16:
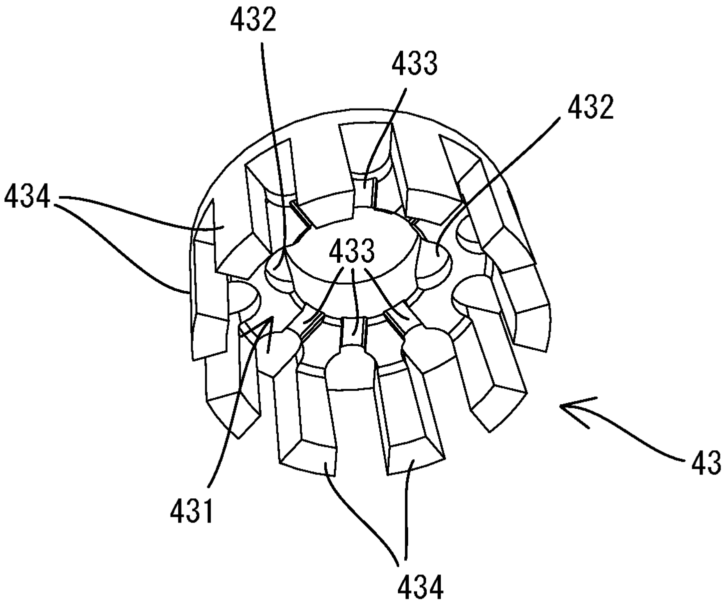
FIG. 16 is a perspective view of the retainer as viewed from behind.

The passages 83 extend between the tapered sleeve 41 and the retainer 43 and are configured to lead the lubricant, which has passed through the passage 81 and flowed outside the spindle 3, to peripheries of the rollers 48. Specifically, as shown in FIG. 16, shallow grooves 433 are formed in the rear surface of the annular part 431 of the retainer 43. Each of the grooves 433 is between the adjacent retaining arms 434 and extends radially from an inner edge to an outer edge of the annular part 431. As shown in FIG. 14, the passages 83 are defined by the front surface of the tapered sleeve 41 and the grooves 433. As described above, the retainer 43 is held such that the rear surface of the annular part 431 is in contact with the front surface of the tapered sleeve 41. However, the lubricant that has flowed outside the spindle 3 can move to the peripheries of the rollers 45 through passages 83, so that the lubricant can lubricate the rollers 45 and the tapered surfaces 411 and 475.

The rollers 45 revolve while rotating in frictional contact with the tapered surface 411 of the tapered sleeve 41 and with the tapered surface 475 of the gear sleeve 47. A difference in rotation between the front portion and the rear portion of each roller 45 causes slipping. The lubricant supplied by way of the passage 81 can effectively reduce wear of the rollers 45 and the tapered surfaces 411 and 475 and can improve the durability of the first clutch 4.

The lubricant that has passed the passages 82 and 83 can move into the recess 80 (the oil reservoir) of the partition wall 141 and can be absorbed and retained by the felt 801 disposed in the recess 80. In this manner, the lubricant can be stored in the recess 80 using the felt 801 to be efficiently circulated.

Figure 17:
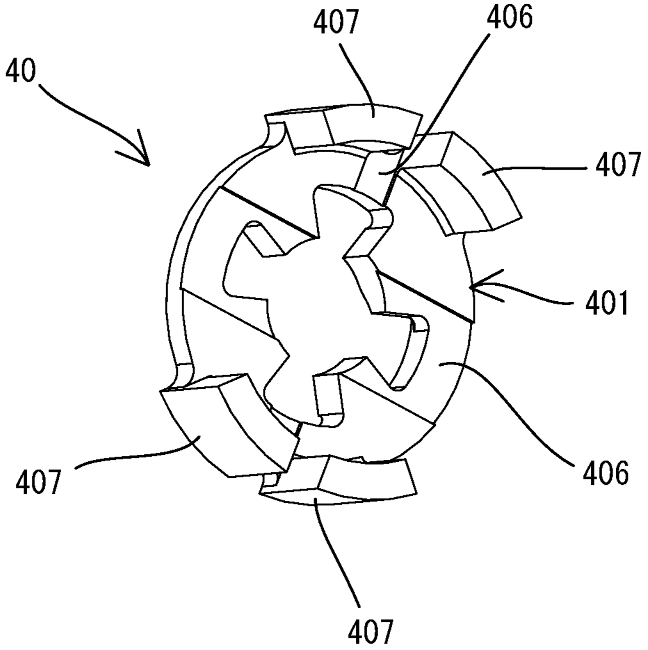
FIG. 17 is a perspective view of the base as viewed from behind.

The passages 84 are configured to lead the lubricant from the recess 80 to an opening of the bearing housing part 143. Specifically, as shown in FIG. 17, two shallow grooves 406 are formed in the rear surface of the annular part 401 of the base 40. The two grooves 406 orthogonally intersects with each other to form a cross shape. Each of the grooves 406 extends in the diametrical direction across the central portion of the annular part 401. As shown in FIGS. 14 and 15, the passages 84 are defined by the front surface of the cylindrical part 142 and the grooves 406. As described above, the base 40 is held such that the rear surface of the annular part 401 is in contact with the front surface of the cylindrical part 142. However, the lubricant that has been absorbed and retained by the felt 801 in the recess 801 can flow through the passages 84 and reach the opening of the bearing housing part 143.

The passages 85 and 86 are configured to lead the lubricant from the opening of the bearing housing part 143 to the inside (specifically, a periphery of the rear end of the spindle 3).

Specifically, as shown in FIG. 5, a shallow groove 144 is formed in the surface that defines the bearing housing part 143. The groove 144 extends from the front end (the protruding end, open end) of the cylindrical part 142 to the central portion of the bottom surface of the bearing housing part 143. As shown in FIG. 14, the passage 85 is defined by the outer surface of the bearing 302 and the groove 144. The lubricant that has reached the opening of the bearing housing part 143 through the passages 84 can enter the bearing housing 143 and the inside of the bearing 302 through the passage 85 and then reach the periphery of the rear end of the spindle 3. Thus, the lubricant can re-enter the passage 81 in the spindle 3.

Further, as shown in FIGS. 14 and 15, the front end of the bearing 302 (the sliding bearing) is positioned slightly rearward of the front end of the cylindrical part 142 of the partition wall 141 in the front-rear direction. The passage 86 is formed by a gap between the front end of the bearing 302 and the rear ends of the base 40 and the tapered sleeve 41. The lubricant that has reached the opening of the bearing housing part 143 through the passages 84 can move to an area surrounding the outer peripheral surface of the spindle 3 through the passage 86 and then reach the periphery of the rear end of the spindle 3 through a gap between the bearing 302 and the spindle 3. Thus, the lubricant can re-enter the passage 81 in the spindle 81

In the present embodiment, the pressure inside the bearing 302 becomes lower than the pressure outside the bearing 302 due to the rotation of the spindle 3. In the present embodiment, since the lubricant can be stored in the recess 80 using the felt 801, the lubricant can be led into the bearing 302 from the recess 80 through the passages 84, 85 and 86, utilizing the pressure difference. Further, since the spindle 3 reciprocates in the front-rear direction relative to the bearing 302, the lubricant can be led into the bearing 302 from the recess 80, utilizing a pump effect.

As described above, in the present embodiment, the elements (in particular, the first clutch 4) in the front housing 13 can be effectively lubricated by the circulation passage 8, which includes the passage 81 inside the spindle 3 and the passages 82 to 86 outside the spindle 3. The circulation passage 8 may include different passage(s) other than the passages in the above-described example. Further, the oil reservoir may be disposed at a position different from that in the above-described example.

Correspondences between the features of the above-described embodiment and the features of the present disclosure are as follows. However, the features of the above-described embodiments are merely exemplary, and therefore the features of the present disclosure are not limit thereto.

The screwdriver 1 is an example of a "screw-tightening tool". The body housing 11 is an example of a "housing". The motor 2 and the output shaft 23 are examples of a "motor" and an "output shaft", respectively. The normal direction (the screw-tightening direction) is an example of a "first direction". The reverse direction (the screw-loosening direction) is an example of a "second direction". The spindle 3 is an example of a "spindle". The driving axis A1 is an example of a "driving axis". The first clutch 4 is an example of a "first clutch". The second clutch 5 is an example of a "second clutch".

The restricting mechanism 6 is an example of a "restricting mechanism". The rotating sleeve 61 (the protrusion 613) is an example of a "first restricting part". The restricting frame 62 (the restricting part 621) is an example of a "second restricting part". The gear sleeve 47 is an example of a "rotational member". The restricting part 621 is an example of a "wall part". The first surface 622 and the second surface 623 are examples of a "first surface" and a "second surface", respectively. The tapered sleeve 41 is an example of a "sun member". The gear sleeve 47 is an example of a "ring member". The retainer 43 is an example of a "carrier". The roller 45 is an example of a "planetary roller". The tapered surface 411 is an example of a "tapered outer peripheral surface of the sun member". The tapered surface 475 is an example of a "tapered inner peripheral surface of the ring member". The first hole 811 and the second hole 812 are examples of a "first hole" a the "second hole", respectively. The circulation passage 8 is an example of a "circulation passage". The recess 80 is an example of a "reservoir".

The above-described embodiment is merely exemplary, and a screw-tightening tool according to the present disclosure is not limited to t the screwdriver 1 of the above-described embodiment. For example, the following modifications may be made-. Further, any one or more of these modifications may be employed in combination with at least one of the screwdriver 1 of the above-described embodiment and the features recited in each claim.

For example, in the above-described embodiment, a so-called planetary-roller-type frictional clutch is employed as the first clutch 4. Instead, a different type of clutch may be employed, as long as the clutch is in an interruption state when the spindle 3 is at the initial position and shifts to a transmission state in response to rearward movement of the spindle 3 from the initial position. For example, a single-plate friction clutch, a multiple-plate friction clutch, or a cone friction clutch may be employed. Alternatively, a positive clutch (e.g., a jaw clutch, a claw clutch) may be employed. Further, in a case in which a so-called planetary-roller-type frictional clutch is employed, the structures (shape, size, the number thereof, etc.) and arrangement of the sun member, the ring member, the carrier, and the planetary rollers may be appropriately changed.

Similarly, a different type of clutch (for example, a sprag type one-way clutch) other than the one-way clutch 51 in the above-described embodiment may be employed as the second clutch 5. The position of the second clutch 5 may be appropriately changed in accordance with or regardless of the change of the first clutch 4.

Further, any structure may be employed in the restricting mechanism 6, as long as the restricting mechanism 6 is configured to restrict the spindle 3 from moving in the front-rear direction only when the motor 2 (the output shaft 23) is rotationally driven in the normal direction.

For example, the rotating sleeve 61 may be operably coupled to a member that is different from the gear sleeve 47 and that is configured to be rotated by the output shaft 23. Further, the number of the protrusions 613 of the rotating sleeve 61 may be one or three or more. Alternatively, a portion of the rotating sleeve 61 other than the protrusion 613 may be configured to abut on the restricting frame 62 (the restricting part 621). The restricting part 621 of the restricting frame 62 or the number of the protrusions 625 may be changed in accordance with the change of the rotating sleeve 61.

The structure that comes into contact with a portion of the rotating sleeve 61 from behind when the rotating sleeve 61 is at the second position to restrict (block, prevent) the rearward movement of the spindle 3 is not limited to the restricting frame 62 (the restricting part 621). For example, such a structure may be formed integrally with the body housing 11 inside the body housing 11 (the front housing 13). For example, at least one protrusion may protrude toward the rotating sleeve 61 from the inner surface of the body housing 11. The protrusion may be configured such that the protrusion is placed directly behind the protrusion 613 of the rotating sleeve 61 and abuts the protrusion 613 from behind only when the rotating sleeve 61 is at the second position, so as to restrict the rearward movement of the spindle 3.

Further, the structure that restricts (prevents) the rotating sleeve 61 from rotating beyond the first position and the second position due to its co-rotation is not limited to the protrusion 625 of the restricting frame 62. For example, similarly to the above-described modification of the restricting part 621, at least one protrusion may protrude from the inner surface of the body housing 11 (the front housing 13) and abut a portion of the rotating sleeve 61 when the rotating sleeve 61 is at the first position or the second position, to thereby prevent the rotating sleeve 61 from further rotating.

The screwdriver 1 may be driven by electric power supplied from a direct current power source. In this case, for example, the body housing 11 may include a battery mounting part that is configured to removably receive a rechargeable battery. The shapes of the body housing 11 and the handle 17, and/or the connection structure therebetween, a kind or the arrangement of the motor 2 may be appropriately changed. For example, the motor 2 may be a DC motor (for example, a brushless DC motor). Further, the motor 2 may be disposed such that the rotational axis of the output shaft 23 intersects with the driving axis A1.

In view of the nature of the present invention and the above-described embodiment, the following structures (aspects) are provided. Any one or more of the following structures may be employed in combination with the screwdriver 1 of the embodiment, the modifications thereof, or the invention recited in each claim.

(Aspect 1)

The output rotation speed of the spindle when the power is transmitted via the second clutch is higher than the output rotation speed of the spindle when the power is transmitted via the first clutch.

According to this Aspect, the rotation speed of the screw in the screw-loosening operation is higher than that in the screw-tightening operation, so that the screw-loosening operation can be optimized.

(Aspect 2)

The spindle is configured to be normally held in an initial position and to be moved to an activation position, which is located rearward of the initial position, in response to rearward pushing of the spindle, and the first clutch is configured to interrupt the power transmission when the spindle is located forward of the activation position and to start to transmit the power when the spindle is placed at the activation position.

(Aspect 3)

The first restricting part is configured to move integrally with the spindle in the front-rear direction, and the second restricting part is configured to prevent the spindle from moving rearward by abutting the first restricting part at the second position, from behind.

According to this Aspect, when the second restricting part is in contact with the first restricting part, the spindle can be reliably prevented from moving rearward.

(Aspect 4)

The screw-tightening tool further comprises:

a first contact part that is configured to come into contact with the first restricting part placed at the first position in response to rotation of the output shaft in the first direction to thereby restrict the first restricting part from rotating in the first direction; and a second contact part configured to come into contact with the first restricting part placed at the second position in response to rotation of the output shaft in the second direction to thereby restrict the first restricting part from rotating in the second direction.

The protrusion 625 of the above-described embodiment is an example of each of the "first contact part" and the "second contact part" in this Aspect.

According to this Aspect, the first restricting part can be reliably prevented from rotating beyond the first position and the second position due to the co-rotation.

(Aspect 5)

The second surface is at a forward side of the first surface in a rotational direction of the first restricting part when the output shaft is rotationally driven in the first direction, and the second surface is inclined rearward toward the rotational direction of the first restricting part when the output shaft is rotated in the first direction.

(Aspect 6)

The second clutch is a one-way clutch that is configured to transmit rotation in one direction and to run idle in a direction opposite to the one direction.

(Aspect 7)

The one-way clutch is disposed radially inside the ring member and radially outside the spindle, and the one-way clutch is configured to transmit rotation of the ring member to the spindle only when the output shaft is rotationally driven in the second direction.

(Aspect 8)

The second hole is open to the outer peripheral surface of the spindle in the first clutch.

(Aspect 9)

The rear end portion of the spindle is supported by a bearing fixed to the housing to be slidable along the driving axis and rotatable around the driving axis, and the reservoir is disposed radially outside the bearing.

(Aspect 10)

The circulation passage includes at least one first passage between the second hole and the reservoir, and at least one second passage between the reservoir and an inside of the bearing.

DESCRIPTION OF THE REFERENCE NUMERALS

1: screwdriver, 11: body housing, 12: rear housing, 13: front housing, 131, stopper part, 133: groove, 14: central housing, 141: partition wall, 142: cylindrical part, 143: bearing housing part, 144: groove, 15: locator, 17: handle, 171: grip part, 173: trigger, 174: main switch, 175: reversing switch lever, 176: reversing switch, 178: controller, 179: power cable, 2: motor, 23: output shaft, 231: bearing, 233: bearing, 24: pinion gear, 301: bearing, 302: bearing, 3: spindle, 31; shaft,

311: bit-insertion hole, 32: shaft, 321: groove, 34: flange, 35: thrust bearing, 36: ball, 4: first clutch, 40: base, 401: annular part, 405: recess, 406: groove, 407: leg, 41: tapered sleeve, 411: tapered surface, 412: protrusion, 414: recess, 419: recess, 43: retainer, 431: annular part, 432: recess, 433: groove, 434: retaining arm, 45: roller, 47: gear sleeve, 470: gear teeth, 471: small-diameter part, 472: shoulder part, 473: stopper ring, 474: large-diameter part, 475: tapered surface, 478: communication hole, 48: bearing, 49: biasing spring, 5: second clutch, 51: one-way clutch, 6: restricting mechanism, 61: rotating sleeve, 611: tubular wall, 613: protrusion, 614: inclined surface, 62: restricting frame, 620: tubular wall, 621: restricting part, 622: first surface, 623: second surface, 625: protrusion, 627: protrusion, 66: holding member, 661: arm, 8: circulation passage, 80: recess, 801: felt, 81: passage, 811: first hole, 812: second hole, 82: passage, 83: passage, 84: passage, 85:

passage, 86: passage, 9: driver bit, 90: screw, 91: workpiece, A1 driving axis

What is claimed is:

1. A screw-tightening tool comprising:

a housing;

a motor within the housing, the motor having an output shaft configured to be rotationally driven selectively in a first direction that corresponds to a direction for tightening a screw and in a second direction that corresponds to a direction for loosening the screw and that is opposite to the first direction;

a spindle that is supported by the housing to be movable along a driving axis and to be rotatable around the driving axis, the driving axis defining a front-rear direction of the screw-tightening tool, the spindle having a front end portion configured to removably receive a tool accessory;

a first clutch that is operably coupled to the output shaft and the spindle and configured to transmit power from the output shaft to the spindle only when the output shaft is rotationally driven in the first direction, and is configured to not transmit power from the output shaft to the spindle when the output shaft is rotationally driven in the second direction; and a second clutch that is operably coupled to the output shaft and the spindle and configured to transmit power from the output shaft to the spindle only when the output shaft is rotationally driven in the second direction, and is configured to not transmit power from the output shaft to the spindle when the output shaft is rotationally driven in the first direction, wherein:

an output rotation speed of the spindle when the power is transmitted via the first clutch is different from an output rotation speed of the spindle when the power is transmitted via the second clutch, in response to a same rotation speed of the output shaft.

2. The screw-tightening tool as defined in claim 1, wherein:

the first clutch is configured to selectively transmit the power depending on a position of the spindle in the front-rear direction, and the second clutch is configured to transmit the power regardless of the position of the spindle in the front-rear direction.

3. The screw-tightening tool as defined in claim 2, further comprising:

a restricting mechanism that is configured to restrict the spindle from moving in the front-rear direction only when the output shaft is rotationally driven in the second direction.

4. The screw-tightening tool as defined in claim 3, wherein the restricting mechanism comprises:

a first restricting part that is rotatable between a first position and a second position in a circumferential direction around the driving axis, the first restricting part being configured to be placed at the first position in response to rotation of the output shaft in the first direction and to be placed at the second position in response to rotation of the output shaft in the second direction; and a second restricting part that is configured to allow the spindle to move in the front-rear direction when the first restricting part is at the first position and to restrict the spindle from moving in the front-rear direction when the first restricting part is at the second position.

5. The screw-tightening tool as defined in claim 4, wherein:

the first restricting part is configured to move integrally with the spindle in the front-rear direction, and the second restricting part is configured to prevent the spindle from moving rearward by abutting the first restricting part at the second position from behind.

6. The screw-tightening tool as defined in claim 4, further comprising:

a rotational member that is disposed between the output shaft and the spindle in a power transmission path and that is configured to be rotated by the output shaft, wherein:

the first restricting part is disposed around the rotational member to be selectively rotatable relative to the rotational member and is configured to co-rotate with the rotational member only between the first position and the second position, and the second restricting part is substantially immovable relative to the housing.

7. The screw-tightening tool as defined in claim 6, further comprising:

a first contact part that is configured to come into contact with the first restricting part placed at the first position in response to rotation of the output shaft in the first direction to thereby restrict rotation of the first restricting part in the first direction; and a second contact part that is configured to come into contact with the first restricting part placed at the second position in response to rotation of the output shaft in the second direction to thereby restrict rotation of the first restricting part in the second direction.

8. The screw-tightening tool as defined in claim 4, wherein:

the second restricting part includes a wall part that extends in the circumferential direction behind the first restricting part in the front-rear direction, a front end surface of the wall part includes:

a first surface that extends in a direction orthogonal to the driving axis and that is configured to come into contact with the first restricting part at the second position, from behind, and a second surface that extends obliquely rearward from one end of the first surface in the circumferential direction and that is configured to allow the spindle to move in the front-rear direction.

9. The screw-tightening tool as defined in claim 1, wherein the first clutch is configured to function as a speed-reducing mechanism.

10. The screw-tightening tool as defined in claim 9, wherein:

the speed-reducing mechanism includes a sun member, a ring member and a carrier that are coaxial with the driving axis, and planetary rollers rollably retained by the carrier, the ring member is configured to be rotated by the output shaft, the carrier is configured to be rotated integrally with the spindle, the planetary rollers are at least partially disposed between a tapered outer peripheral surface of the sun member and a tapered inner peripheral surface of the ring member in a radial direction of the ring member, the ring member is configured to move integrally with the spindle in the front-rear direction relative to the sun member, and the first clutch is configured to transmit the power when the planetary rollers selectively come into frictional contact with the tapered outer peripheral surface of the sun member and the tapered inner peripheral surface of the ring member in response to rearward movement of the spindle from an initial position.

11. The screw-tightening tool as defined in claim 10, wherein the second clutch is a one-way clutch that is configured to transmit rotation in one direction and to run idle in a direction opposite to the one direction.

12. The screw-tightening tool as defined in claim 1, further comprising:

a circulation passage in the housing, wherein:

the spindle has a first hole that extends forward from a rear end of the spindle, and a second hole that communicates with the first hole, the second hole extending in a direction intersecting with the first hole and being open to an outer peripheral surface of the spindle, and the circulation passage is configured to return a lubricant, which has passed through the first hole and the second hole and has flowed outside the spindle, to the rear end of the spindle.

13. The screw-tightening tool as defined in claim 12, wherein a reservoir for the lubricant is disposed in the circulation passage.

14. The screw-tightening tool as defined in claim 2, wherein:

the spindle is configured to be normally held in an initial position and to be moved to an activation position, which is located rearward of the initial position, when the spindle is pushed rearward, the first clutch is a friction clutch or a positive clutch that is configured to interrupt the power transmission when the spindle is located forward of the activation position and to start to transmit the power when the spindle is placed at the activation position, and the second clutch is a one-way clutch that is configured to transmit rotation in one direction and to run idle in a direction opposite to the one direction.

15. The screw-tightening tool as defined in claim 10, wherein the first clutch is configured to function as a speed-reducing mechanism.

16. The screw-tightening tool as defined in claim 5, further comprising:

a rotational member that is disposed between the output shaft and the spindle in a power transmission path and that is configured to be rotated by the output shaft, wherein:

the first restricting part is disposed around the rotational member to be selectively rotatable relative to the rotational member and is configured to co-rotate with the rotational member only between the first position and the second position, and the second restricting part is substantially immovable relative to the housing.

17. The screw-tightening tool as defined in claim 6, wherein:

the second restricting part includes a wall part that extends in the circumferential direction behind the first restricting part in the front-rear direction, a front end surface of the wall part includes:

a first surface that extends in a direction orthogonal to the driving axis and that is configured to come into contact with the first restricting part at the second position, from behind, and a second surface that extends obliquely rearward from one end of the first surface in the circumferential direction and that is configured to allow the spindle to move in the front-rear direction.

18. The screw-tightening tool as defined in claim 1, wherein the first clutch is a planetary roller speed-reducing mechanism, and the spindle having a rear end portion rotating integrally with a carrier of planetary roller speed-reducing mechanism.

19. A screw-tightening tool comprising:

a housing;

a motor within the housing, the motor having an output shaft configured to be rotationally driven selectively in a first direction that corresponds to a direction for tightening a screw and in a second direction that corresponds to a direction for loosening the screw and that is opposite to the first direction;

a spindle that is supported by the housing to be movable along a driving axis and to be rotatable around the driving axis, the driving axis defining a front-rear direction of the screw-tightening tool, the spindle having a front end portion configured to removably receive a tool accessory;

a first clutch that is operably coupled to the output shaft and the spindle and configured to transmit power from the output shaft to the spindle only when the output shaft is rotationally driven in the first direction;

a second clutch that is operably coupled to the output shaft and the spindle and configured to transmit power from the output shaft to the spindle only when the output shaft is rotationally driven in the second direction, and a restricting mechanism that is configured to restrict the spindle from moving in the front-rear direction only when the output shaft is rotationally driven in the second direction, the restricting mechanism including:

a first restricting part that is rotatable between a first position and a second position in a circumferential direction around the driving axis, the first restricting part being configured to be placed at the first position in response to rotation of the output shaft in the first direction and to be placed at the second position in response to rotation of the output shaft in the second direction; and a second restricting part that is configured to allow the spindle to move in the front-rear direction when the first restricting part is at the first position and to restrict the spindle from moving in the front-rear direction when the first restricting part is at the second position, wherein:

an output rotation speed of the spindle when the power is transmitted via the first clutch is different from an output rotation speed of the spindle when the power is transmitted via the second clutch, in response to a same rotation speed of the output shaft, the first clutch is configured to selectively transmit the power depending on a position of the spindle in the front-rear direction, the second clutch is configured to transmit the power regardless of the position of the spindle in the front-rear direction.

* * * * *